US012397557B2

(12) United States Patent
Tsutsumi et al.

(10) Patent No.: US 12,397,557 B2
(45) Date of Patent: Aug. 26, 2025

(54) PRINTING APPARATUS AND PRINTHEAD

(71) Applicant: CANON KABUSHIKI KAISHA, Tokyo (JP)

(72) Inventors: Hiromasa Tsutsumi, Kanagawa (JP); Hideaki Matsumura, Tokyo (JP); Tsuyoshi Saeki, Kanagawa (JP); Yuri Mori, Tokyo (JP); Koki Shimada, Kanagawa (JP); Shota Asada, Tokyo (JP); Ken Takenaga, Kanagawa (JP); Daiju Takeda, Kanagawa (JP); Mineyoshi Tomie, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 18/139,556

(22) Filed: Apr. 26, 2023

(65) Prior Publication Data

US 2024/0083175 A1 Mar. 14, 2024

(30) Foreign Application Priority Data

Apr. 27, 2022 (JP) ................................. 2022-073671

(51) Int. Cl.
*B41J 2/175* (2006.01)

(52) U.S. Cl.
CPC ................................. *B41J 2/17523* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 29/02; B41J 29/13
See application file for complete search history.

(56) References Cited

U.S. PATENT DOCUMENTS

2017/0120603 A1* 5/2017 Shimmachi .............. B41J 2/175

FOREIGN PATENT DOCUMENTS

JP 3948959 B2 7/2007

* cited by examiner

*Primary Examiner* — Anh T Vo
(74) *Attorney, Agent, or Firm* — Venable LLP

(57) ABSTRACT

A printing apparatus includes a support member configured to support a printhead that performs printing by discharging ink to a print medium, a connecting member including a connecting portion connected to an ink introduction portion of the printhead and through which the ink introduction portion communicates with an ink supply passage via the connecting portion, a rotation member configured to hold the connecting member such that a posture of the connecting member is changeable, and configured to be supported by the support member to be rotatable between a connecting position at which the ink introduction portion and the connecting portion are connected and a connection releasing position at which the ink introduction portion and the connecting portion are not connected, and a biasing portion configured to bias the connecting member to a first posture with respect to the rotation member.

20 Claims, 17 Drawing Sheets

FIG. 9B
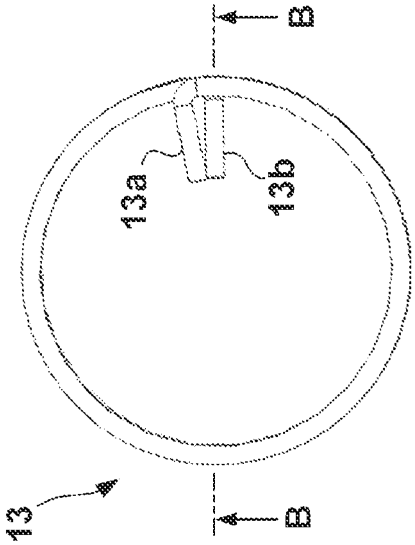
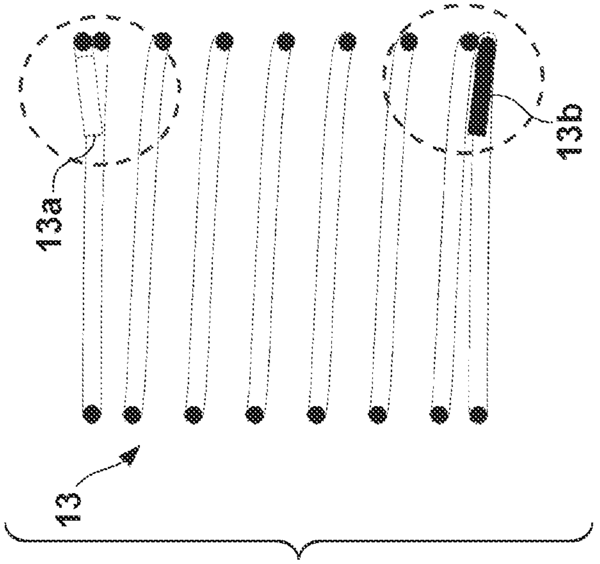
FIG. 9C
FIG. 9A
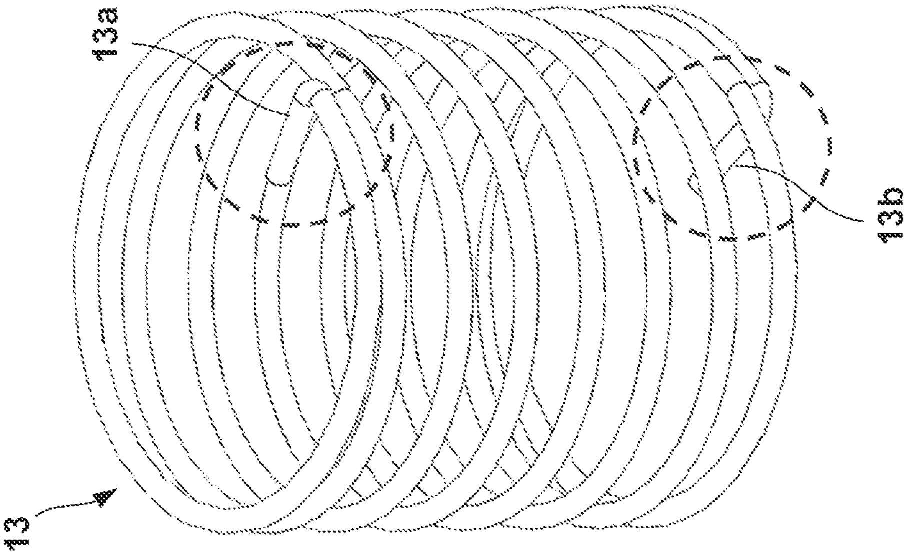

PRINTING APPARATUS AND PRINTHEAD

BACKGROUND OF THE INVENTION

Field of the Invention

The present invention relates to a printing apparatus.

Description of the Related Art

There is proposed a printing apparatus including a member that connects a printhead and an ink supply tube. Japanese Patent No. 3948959 discloses a printing apparatus in which a joint member is rotatably attached to a carriage cover. A tube is connected to the joint member. If the carriage cover is closed, the printhead and the joint member are connected, and ink is supplied from the tube to the printhead. The joint member is loosely fitted in a groove formed in a carriage. When the carriage cover is closed, the joint member is guided by the groove, and its posture with respect to the printhead is controlled.

In the configuration of Japanese Patent No. 3948959, the joint member moves in an arc pattern in accordance with the rotation of the carriage cover, but the groove has a linear shape. If the fitting between the joint member and the groove is tight, it may be difficult for the joint member to smoothly move. If the fitting between the joint member and the groove is loosened, the joint member can smoothly move. However, the posture of the joint member readily changes, and the connection accuracy between the printhead and the joint member may lower due to an unintended change of the posture.

SUMMARY OF THE INVENTION

The present invention provides a technique capable of improving connection accuracy when connecting a connecting member to a printhead.

According to an aspect of the present invention, there is provided a printing apparatus comprising: a support member configured to support a printhead that performs printing by discharging ink to a print medium; a connecting member including a connecting portion connected to an ink introduction portion of the printhead and through which the ink introduction portion communicates with an ink supply passage via the connecting portion; a rotation member configured to hold the connecting member such that a posture of the connecting member is changeable, and configured to be supported by the support member to be rotatable between a connecting position at which the ink introduction portion and the connecting portion are connected and a connection releasing position at which the ink introduction portion and the connecting portion are not connected; and a biasing portion configured to bias the connecting member to a first posture with respect to the rotation member.

Further features of the present invention will become apparent from the following description of exemplary embodiments (with reference to the attached drawings).

BRIEF DESCRIPTION OF THE DRAWINGS

FIGS. 9A to 9C are explanatory views of a biasing portion:

DESCRIPTION OF THE EMBODIMENTS

Figure 1:
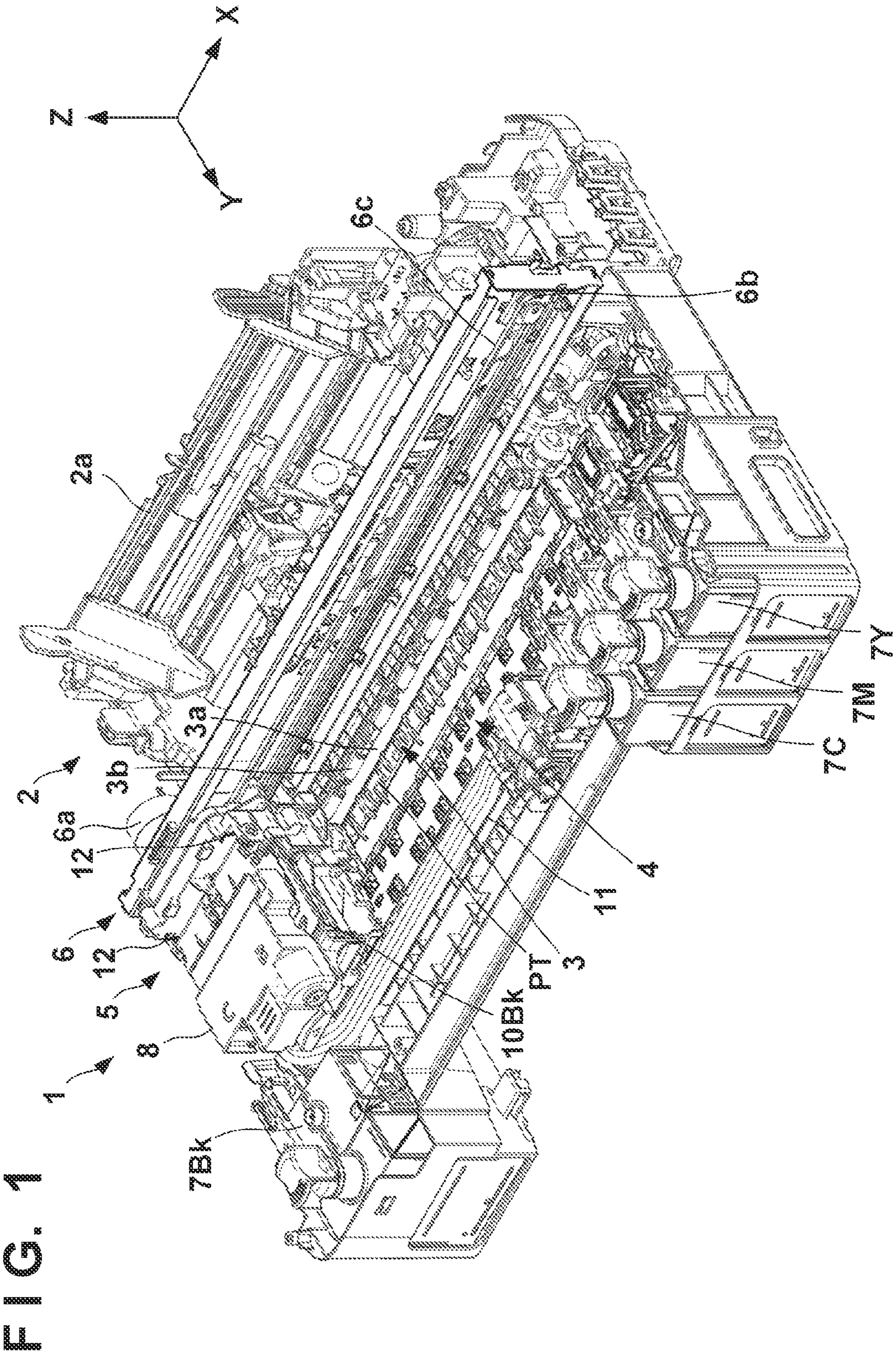
FIG. 1 is a view showing the outer appearance of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar elements or configurations, and redundant description thereof is omitted.

First Embodiment

"1. Outline of Printing Apparatus"

FIG. 1 is a perspective view of a printing apparatus 1 according to an embodiment of the present invention. The printing apparatus 1 according to this embodiment is an inkjet printing apparatus that performs printing on a print medium by discharging ink. However, the present invention can also be applied to various kinds of printing apparatuses other than the inkjet printing apparatus. In the drawings, arrows X and Y indicate directions crossing each other, and these are orthogonal to each other in this embodiment. An arrow Z indicates a vertical direction (gravity direction). The X direction is the widthwise direction of the printing apparatus 1 (the left-and-right direction, or the widthwise direction of a print medium). The Y direction is the depth direction (front-and-rear direction) of the printing apparatus 1.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium", cloth, a plastic film, and the like may also be used.

The printing apparatus 1 includes a feed unit 2, a conveyance unit 3, and a discharge unit 4, which are configured to convey a print medium. The feed unit 2 includes a tray 2*a* on which sheet-like print media are stacked, and a feed mechanism (not shown) for the print medium. The feed mechanism includes, for example, a feed roller that feeds the print medium on the tray 2*a*, and a feed motor that is a driving source for rotating the feed roller.

The conveyance unit 3 is a mechanism that conveys, in the Y direction (sub-scanning direction), the print medium fed from the feed unit 2. The conveyance unit 3 includes a conveyance roller 3*a*, and a conveyance motor (not shown) that is a driving source for rotating the conveyance roller 3*a*. Pinch rollers 3*b* are pressed against the conveyance roller 3*a*, and the print medium is clamped in the nip portions between these. When the conveyance roller 3*a* rotates, the print medium is conveyed on a platen PT.

The discharge unit 4 is a mechanism that further conveys, in the Y direction (sub-scanning direction), the print medium conveyed from the conveyance unit 3. The discharge unit 4 includes a discharge roller, a conveyance motor that is a driving source for rotating the discharge roller, and spurs in contact with the discharge roller (none are shown), and discharges the print medium to the front side of the printing apparatus 1.

Containers 7Bk, 7C, 7M, and 7Y (to be referred to as containers 7 hereinafter generically or without distinction) are ink tanks in which liquid inks are stored. In this embodiment, the container 7 is a stationary type container fixed in the printing apparatus 1. If the remaining ink amount decreases, a user replenishes ink to the container 7 without detaching the container 7 from the printing apparatus 1. Inks of different types are stored in the four containers 7. In this embodiment, black ink is stored in the container 7Bk, cyan ink is stored in the container 7C, magenta ink is stored in the container 7M, and yellow ink is stored in the container 7Y. Note that the types of ink are not limited to four types, as in this embodiment, and one type of ink may be used, or a plurality of types other than the four types may be used. The number of containers 7 need only be equal to or more than the number of types of inks.

The printing apparatus 1 includes a carriage 5. The carriage 5 is a support member that supports a printhead 10Cr (not shown in FIG. 1) and a printhead 10Bk (to be referred to as printheads 10 hereinafter generically or without distinction). The carriage 5 is covered with a head set cover 8 from above. The printhead 10 according to this embodiment is a printhead that performs printing by discharging ink supplied from the container 7 to a print medium. The printhead 10 includes a discharge surface 101 (see FIGS. 3 and 4) with a plurality of nozzles for discharging ink. The discharge surface 101 is arranged to face the platen PT. Each nozzle is provided with, for example, an electrothermal transducer (heater). When the electrothermal transducer is energized, ink is heated and foamed. The ink is discharged by the foaming energy. A structure that discharges ink using a piezoelectric element in place of the electrothermal transducer may be used.

The carriage 5 is reciprocally moved in the X direction (main scanning direction) by the driving unit 6. The driving unit 6 includes a driving pulley and a driven pulley (only a driven pulley 6*b* is shown in FIG. 1) which are arranged apart in the X direction, an endless belt 6*c* wound around the pulleys, and a carriage motor 6*a* that is a driving source for rotating the driving pulley. The carriage 5 is connected to the endless belt 6*c*. When the endless belt 6*c* is made to travel, the carriage 5 moves in the X direction.

In the process of the movement of the carriage 5, ink is discharged from the printhead 10 to the print medium on the platen PT, thereby printing an image. This operation is sometimes called print scanning. A printing operation is performed by alternately repeating a print medium conveyance operation by the conveyance unit 3 and print scanning. That is, the conveyance unit 3 intermittently conveys the print medium, and print scanning is performed when the print medium conveyance is stopped, thereby printing an image on the print medium.

As described above, the printing apparatus 1 according to this embodiment is a serial type inkjet printing apparatus in which the printhead 10 is mounted on the carriage 5 that reciprocally moves in the X direction. However, the present invention can also be applied to another printing apparatus such as an inkjet printing apparatus including a so-called full-line head (printhead) provided with a plurality of nozzles configured to discharge a liquid to a region corresponding to the width of a print medium.

"2. Structure on Periphery of Carriage"

Figure 2:
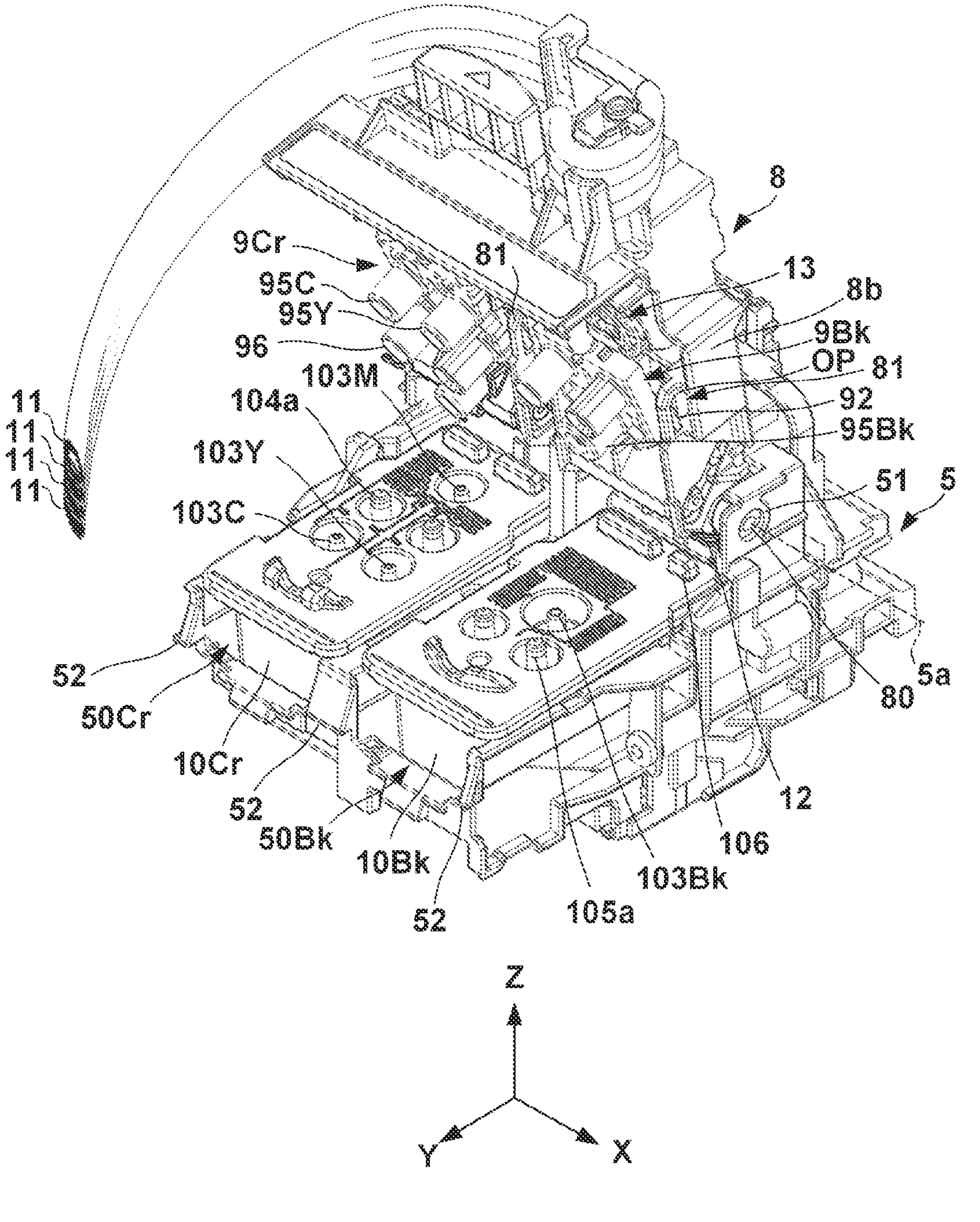
FIG. 2 is a perspective view showing the structure on the periphery of a carriage.
Figure 3:
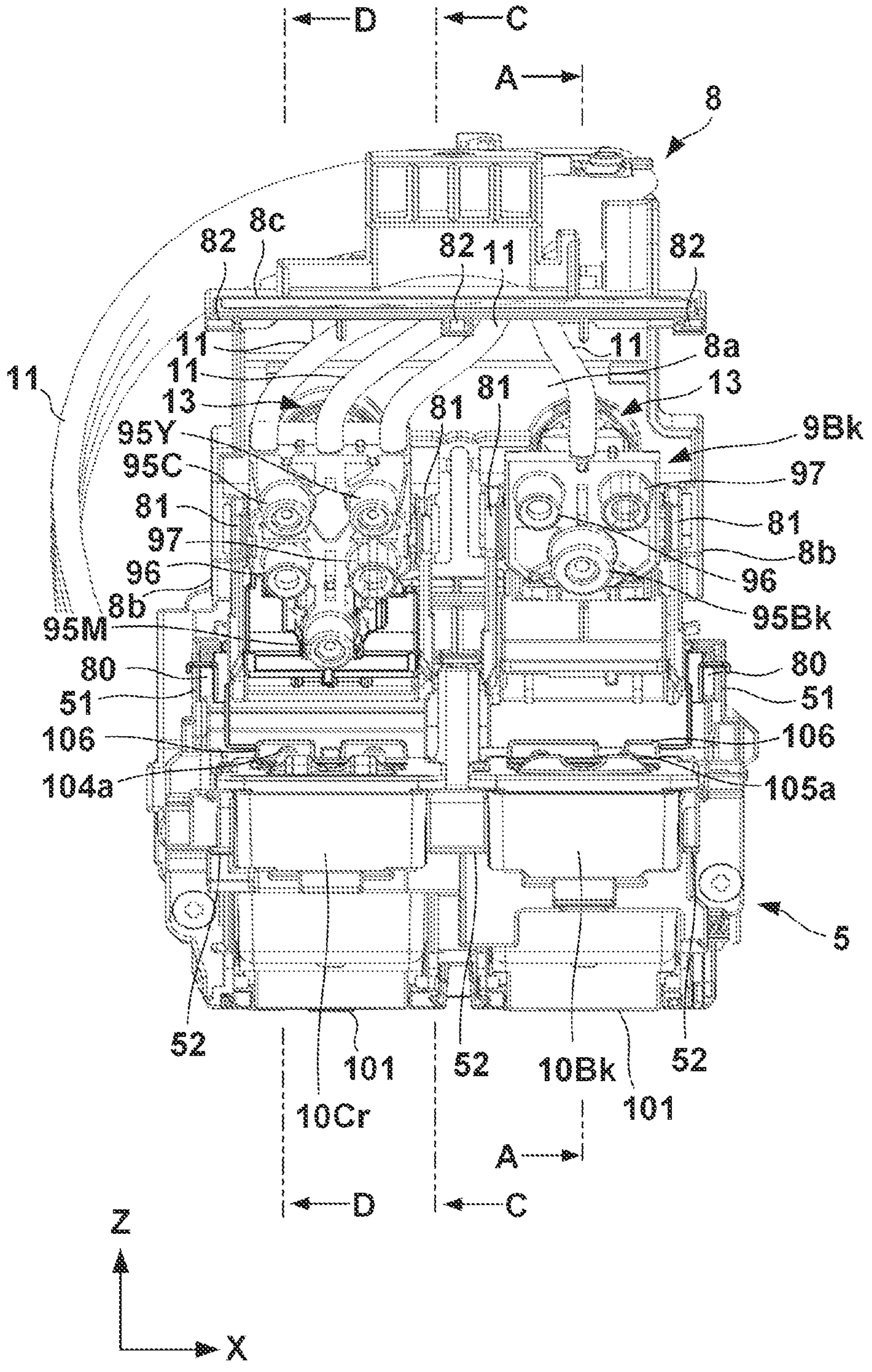
FIG. 3 is a front view showing the structure on the periphery of the carriage.

The structure on the periphery of the carriage 5 will be described with reference to FIGS. 2 to 9 in addition to FIG. 1. FIGS. 2 and 3 will mainly be referred to. FIG. 2 is a perspective view showing the structure on the periphery of the carriage 5, and FIG. 3 is a front view showing the structure on the periphery of the carriage 5. FIGS. 2 and 3 show a state in which the head set cover 8 is located at the open position.

<Printheads>

In this embodiment, a plurality of printheads 10 are supported by the carriage 5. More specifically, two types of printheads 10 including the printhead 10Cr and the printhead 10Bk are supported. The printhead 10Cr is a printhead that discharges cyan ink, magenta ink, and yellow ink. The printhead 10Bk is a printhead that discharges black ink. In this embodiment, the printheads 10 are exchangeably supported by the carriage 5. Since the printheads 10 are exchangeable, formally, the printheads 10 and the apparatus main body other than those are called the printing apparatus 1, but the apparatus main body is called the printing apparatus 1 in some cases.

Figure 4:
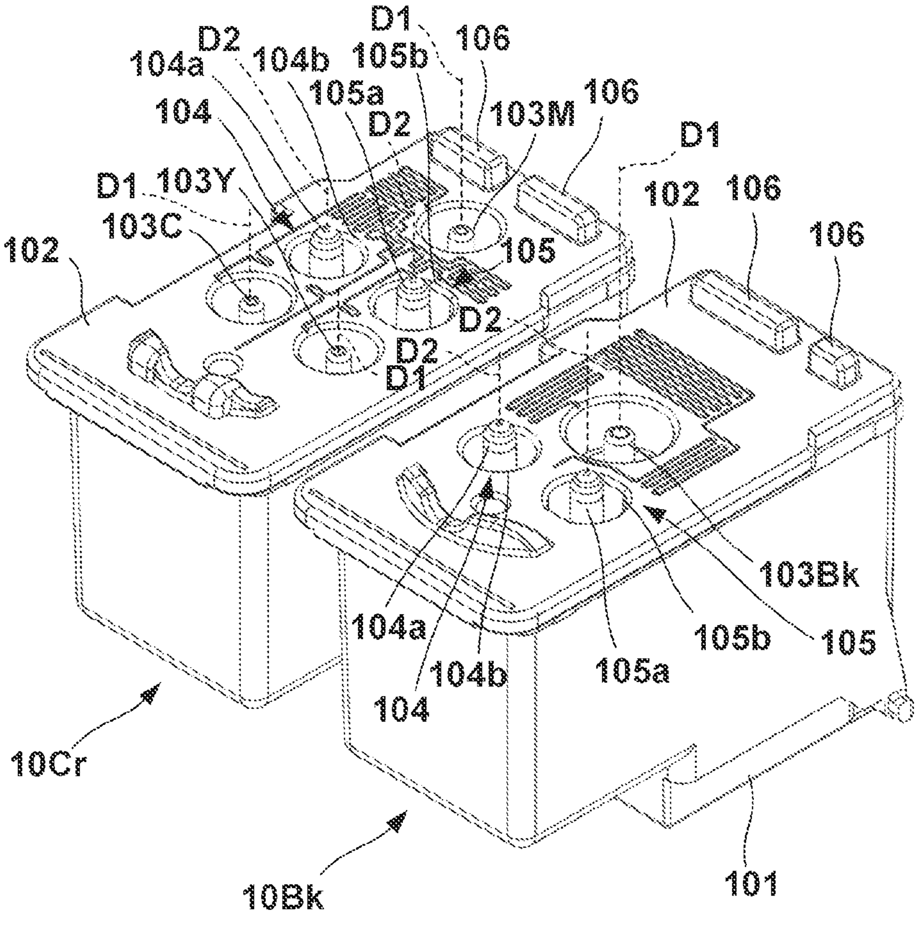
FIG. 4 is a perspective view of printheads.

FIG. 4 will also be referred to. FIG. 4 is a perspective view of the printheads 10Cr and 10Bk. The printhead 10 has a rectangular parallelopiped shape as a whole, and includes the discharge surface 101 on the bottom portion. An upper surface 102 of the printhead 10 is provided with the following components.

The upper surface 102 of the printhead 10Bk is provided with an engaging portion 106 projecting upward from the upper surface 102, an ink introduction portion 103Bk, and posture control portions 104 and 105. The engaging portion 106 is an engaging portion for positioning when the printhead 10Bk is attached to the carriage 5. The ink introduction portion 103Bk is a portion serving as an inlet to introduce black ink stored in the container 7Bk to the printhead 10Bk, and is a tube member extending in the vertical direction. A circular concave portion is formed around the ink introduction portion 103Bk. The posture control portions 104 and 105 are members that change the posture of a connecting member 9Bk. The posture control portion 104 includes a shaft portion 104*a* having a columnar shape (circular section), and a concave portion 104*b* having a cylindrical shape. The diameter of the distal end of the shaft portion 104*a* is gradually reduced. The posture control portion 105 includes a shaft portion 105*a* having an elliptic columnar shape (elliptic section), and a concave portion 105*b* having an elliptic cylindrical shape. The diameter of the distal end of the shaft portion 105*a* is gradually reduced.

The upper surface 102 of the printhead 10Cr is provided with the engaging portion 106 projecting upward from the upper surface 102, ink introduction portions 103Y, 103M, and 103C, and the posture control portions 104 and 105. The engaging portion 106 is an engaging portion for positioning when the printhead 10Cr is attached to the carriage 5. The ink introduction portions 103Y, 103M, and 103C are portions serving as inlets to introduce yellow ink, magenta ink, and cyan ink stored in the containers 7Y, 7M, and 7C to the printhead 10Cr, and are tube members extending in the vertical direction. A circular concave portion is formed around each of the ink introduction portions 103Y, 103M, and 103C. The posture control portions 104 and 105 are members that change the posture of a connecting member 9Cr. The posture control portion 104 includes the shaft portion 104*a* having a columnar shape, and the concave portion 104*b* having a cylindrical shape. The diameter of the distal end of the shaft portion 104*a* is gradually reduced. The posture control portion 105 includes the shaft portion 105*a* having an elliptic columnar shape, and the concave portion 105*b* having an elliptic cylindrical shape. The diameter of the distal end of the shaft portion 105*a* is gradually reduced.

Referring to FIG. 4, arrows D1 indicate the extending directions (axial directions) of the ink introduction portions 103Bk, 103Y, 103M, and 103C (to be referred to as ink introduction portions 103 hereinafter generically or without distinction). The arrows D1 also indicate the connecting directions between the ink introduction portions 103Bk, 103Y, 103M, and 103C and connecting portions 95Bk, 95Y, 95M, and 95C (to be described later). Arrows D2 indicate the extending directions (axial directions) of the shaft portions 104*a* of the posture control portions 104 and 105, and also indicate the connecting directions between the posture control portions 104 and 105 and engaging portions 96 and 97 (to be described later). In this embodiment, the directions D1 and the directions D2 are parallel.

<Carriage and Head Set Cover>

FIGS. 1 to 3 will mainly be referred to. The carriage 5 includes a head storage portion 50Cr that stores the printhead 10Cr, and a head storage portion 50Bk that stores the printhead 10Bk. The head storage portion 50Cr and the head storage portion 50Bk are arranged in the X direction. For this reason, the printhead 10Cr and the printhead 10Bk are arranged in the X direction, too. The carriage 5 includes an opening portion in the bottom portion, and the discharge surfaces 101 of the printhead 10Cr and the printhead 10Bk are exposed to the outside (lower side) of the carriage 5. On the front portion of the carriage 5, a plurality of lock portions 52 that maintain the head set cover 8 at the closed position are provided apart in the X direction.

The head set cover 8 is a rotation member that is rotatably supported by the carriage 5 and enables exchange of the printhead 10. The head set cover 8 includes an upper wall portion 8*a*, left and right side wall portions 8*b*, and a front wall portion 8*c*, and has a box shape open to the lower and rear sides as a whole.

The carriage 5 is provided with rotation shafts 51 apart to the left and right sides. The left and right side wall portions 8*b* of the head set cover 8 are provided with bearings 80 that support the rotation shafts 51, and the head set cover 8 can rotate, with respect to the carriage 5, about a rotation center line 5*a* that is the center of the rotation shafts 51. In this embodiment, the direction of the rotation center line 5*a* is the X direction.

Figure 7:
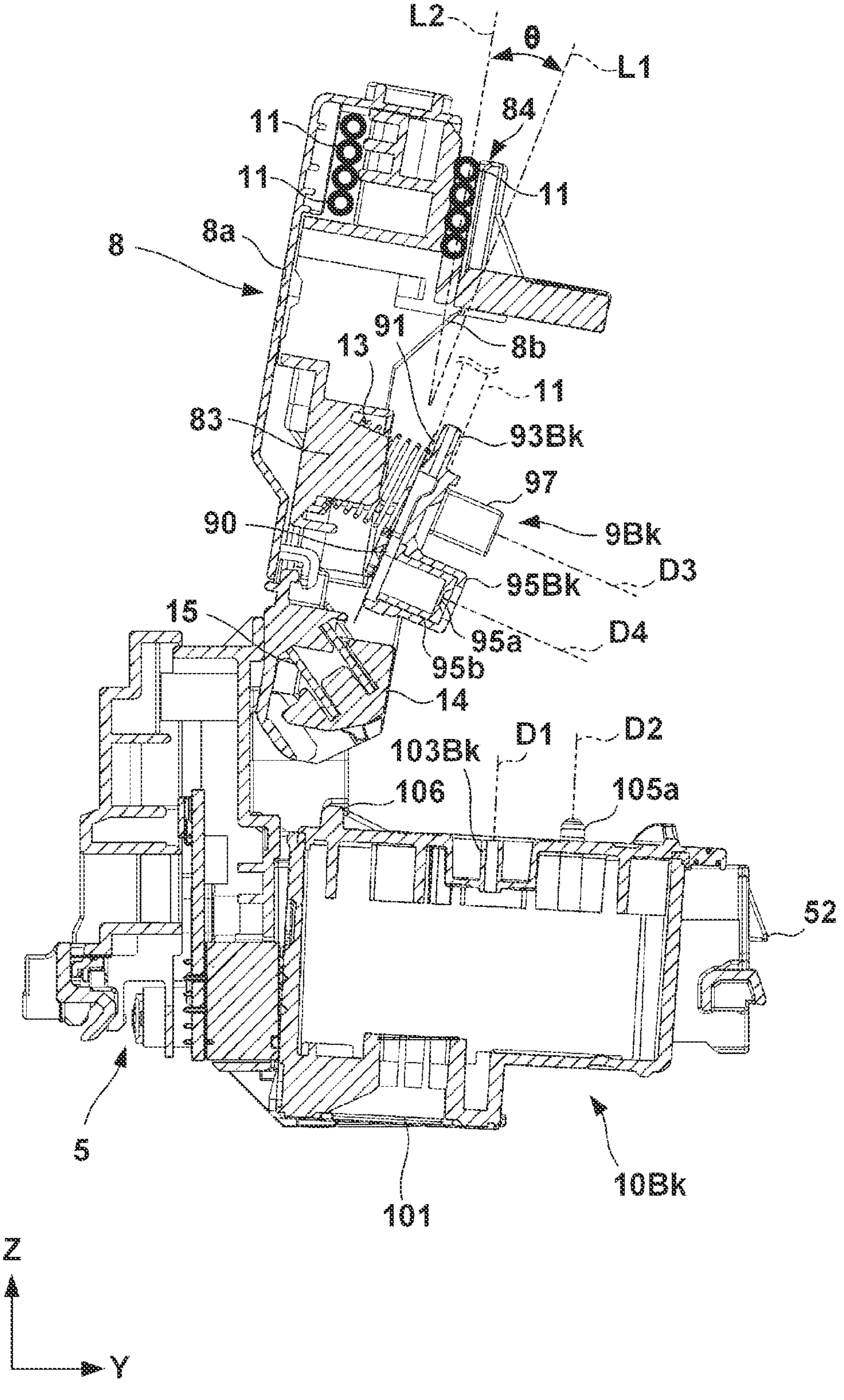
FIG. 7 is a sectional view taken along a line A-A in FIG. 3.
Figure 8:
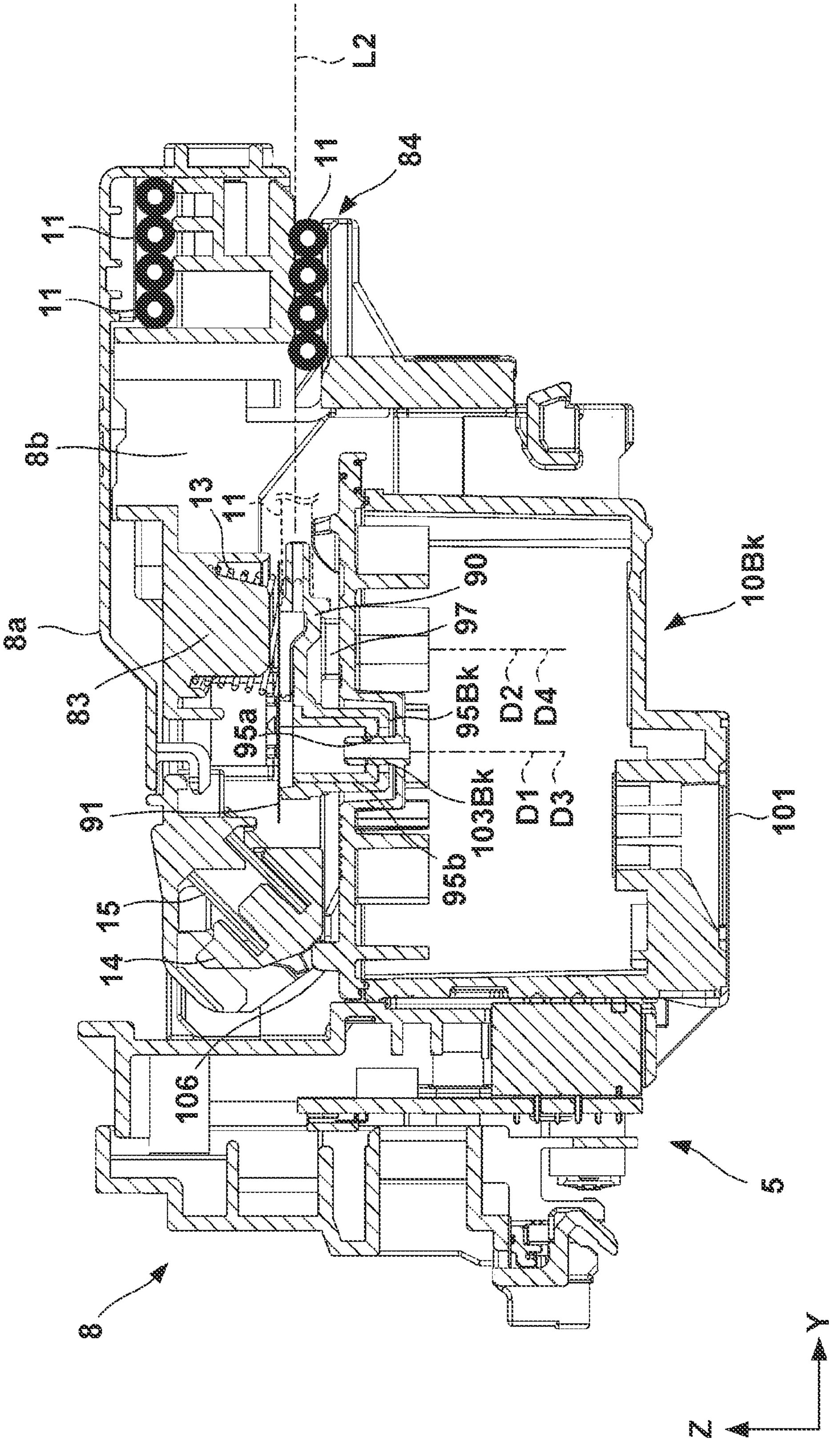
FIG. 8 is a sectional view showing a state in which ahead set cover is located at a closed position.

An elastic member 12 that biases the head set cover 8 to the open position is provided near each rotation shaft 51. In this embodiment, the elastic member 12 is a torsion coil spring through which the rotation shaft 51 is inserted. A plurality of lock portions 82 corresponding to the lock portions 52 of the carriage 5 are provided on the front wall portion 8*c* of the head set cover 8. FIG. 7 is a sectional view taken along a line A-A in FIG. 3, and shows a state in which the head set cover 8 is located at the open position. FIG. 8 is a sectional view corresponding to the line A-A in FIG. 3, and shows a state in which the head set cover 8 is located at the closed position. The lock portions 52 and the lock portions 82 each have a wedge shape, and the head set cover 8 is maintained at the closed position by locking the lock portions 82 on the lock portions 52. When the lock between the lock portions 52 and the lock portions 82 is released, the head set cover 8 is automatically rotated to the open position by the biasing of the elastic members 12.

<Connecting Members>

FIGS. 1 to 3, 7, and 8 will mainly be referred to. The connecting members 9Cr and 9Bk (to be referred to as connecting members 9 hereinafter generically or without distinction) are held by the head set cover 8. The connecting members 9 are arranged inside the upper wall portion 8*a*. If the head set cover 8 is located at the closed position (FIG. 8), the upper wall portion 8*a* covers the printheads 10 from above. In this respect, the upper wall portion 8*a* can be called a cover portion. If the head set cover 8 is located at the closed position (FIG. 8), the connecting members 9 are located between the upper wall portion 8*a* and the printheads 10.

The connecting members 9 are held by a plurality of holding portions 81 of the head set cover 8 such that the postures of the connecting members 9 can be changed. Each holding portion 81 is formed to project inward from the upper wall portion 8*a*, and each connecting member 9 is held by a pair of holding portions 81 apart to the left and right sides. In this embodiment, to hold the two connecting members 9, a total of four holding portions 81 are provided on the head set cover 8.

The connecting members 9 are members that relay the printheads 10 and tubes 11. A total of four tubes 11 are provided in correspondence with the types of ink, and each tube 11 is connected to a corresponding one of the containers 7Bk, 7C, 7M, and 7Y. Each tube 11 is a long member with flexibility and forms an ink supply passage. The four tubes are held and fixed at their middle portions by a groove-shaped holding portion 84 provided in the head set cover 8.

Figure 5:
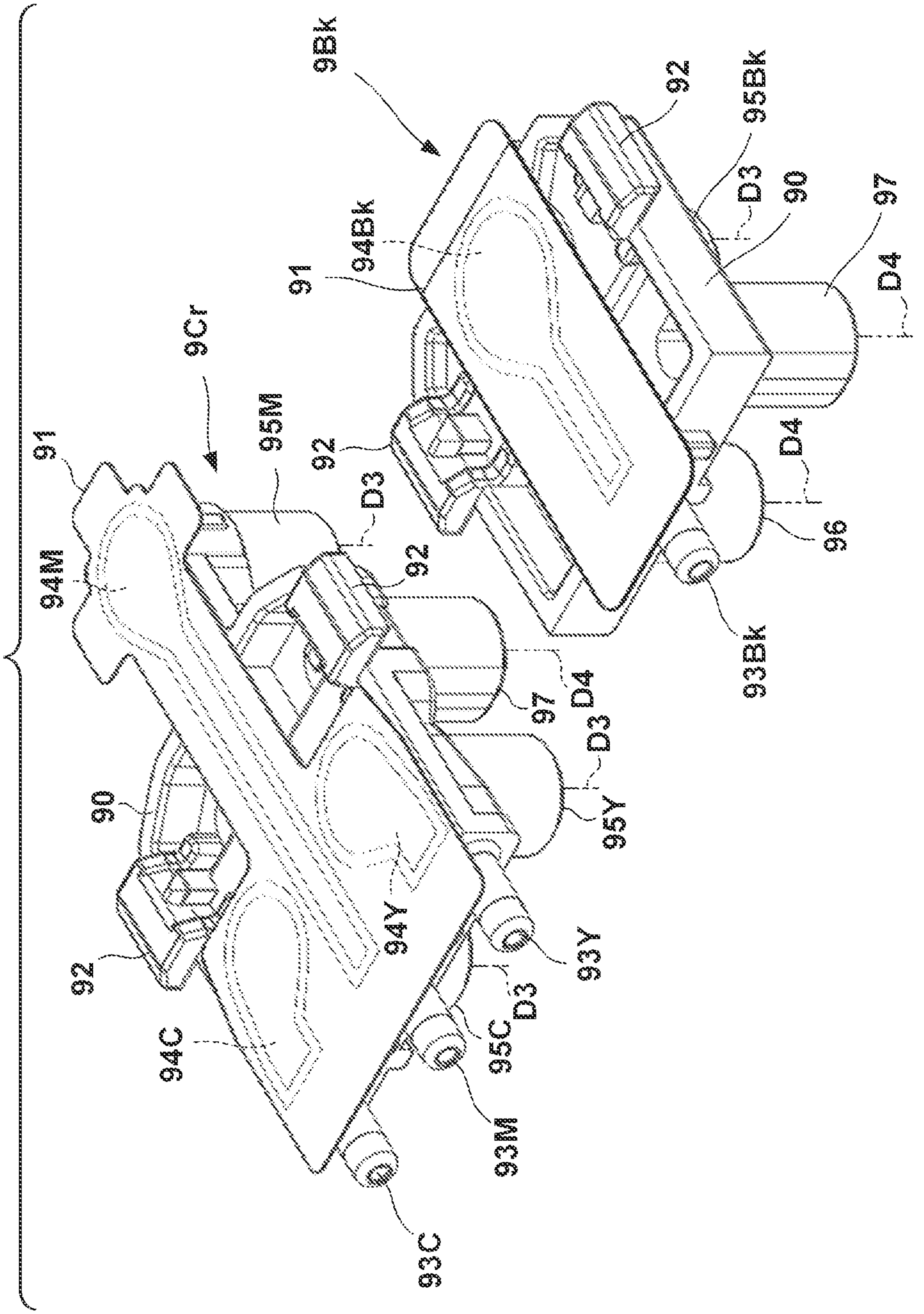
FIG. 5 is a perspective view of connecting members.
Figure 6:
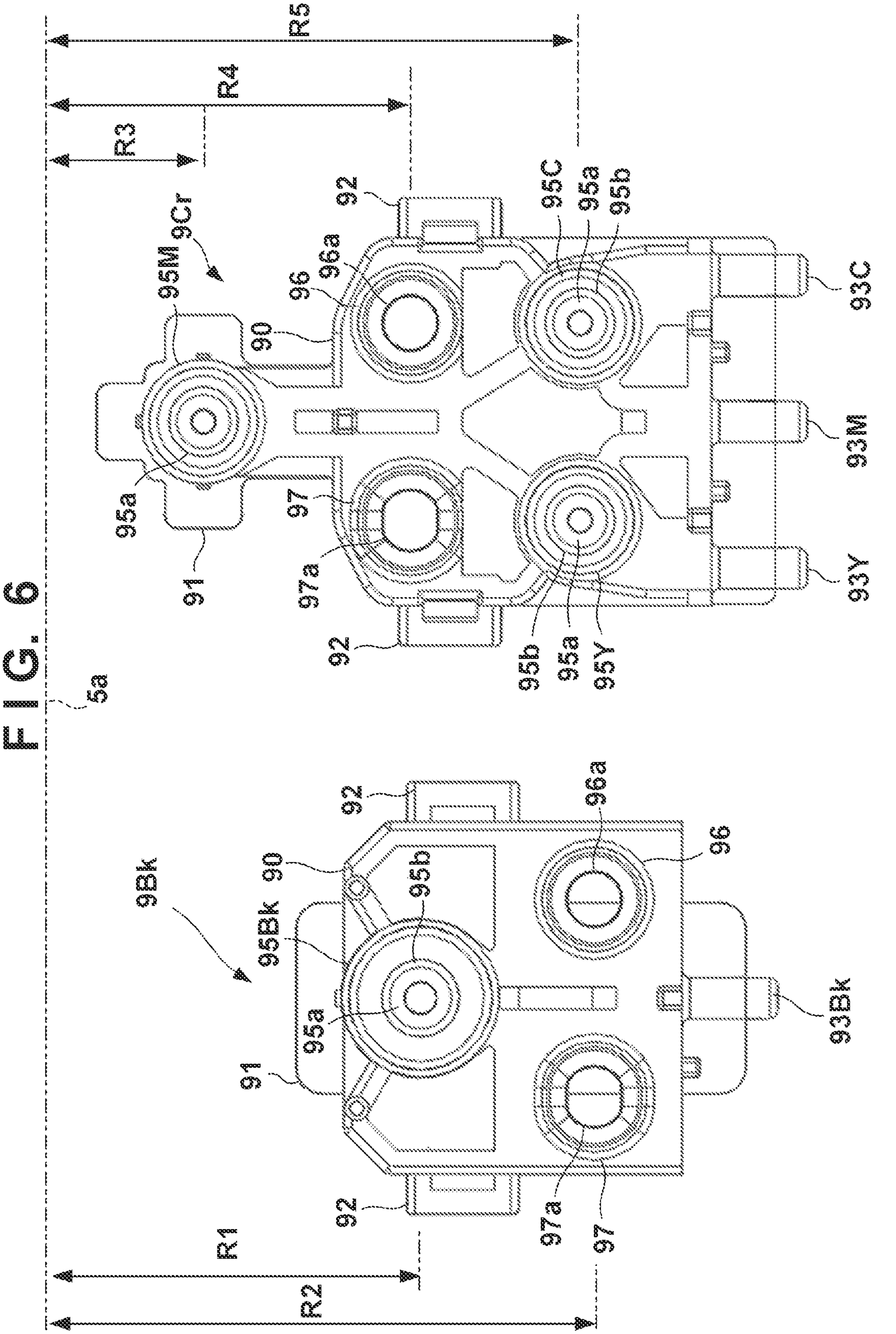
FIG. 6 is a bottom view of the connecting members.

FIGS. 5 and 6 will be referred to together. FIG. 5 is a perspective view of the connecting members 9Cr and 9Bk. FIG. 6 is a bottom view of the connecting members 9Cr and 9Bk.

The connecting member 9Bk includes a main body 90, and a sealing member 91. The main body 90 integrally includes a flow-in portion 93Bk provided at the front end portion, a pair of claw portions 92 provided on the left and right side portions, and the connecting portion 95Bk and the engaging portions 96 and 97 which are provided on the bottom surface. The tube 11 that forms the ink supply passage for black ink is connected to the flow-in portion 93Bk. The connecting portion 95Bk is a member connected to the ink introduction portion 103Bk of the printhead 10Bk. The connecting portion 95Bk according to this embodiment is a tubular member, and a connecting port 95*a* to/from which the ink introduction portion 103Bk is inserted/removed is formed in it. An elastic member 95*b* is provided on the inner circumferential surface of the connecting portion

95Bk (FIGS. 7 and 8). The elastic member 95*b* is a sealing elastomer that seals the connecting port 95*a* and the ink introduction portion 103Bk and is, for example, molded integrally with the connecting portion 95Bk.

A groove-shaped relay passage 94Bk through which the flow-in portion 93Bk and the connecting portion 95Bk communicate is formed on the upper surface of the main body 90. The sealing member 91 is, for example, a sheet-shaped film welded to the upper surface of the main body 90, and the relay passage 94Bk is sealed by the sealing member 91. When the connecting portion 95Bk and the ink introduction portion 103Bk are connected, the ink supply passage of the tube 11 and the ink introduction portion 103Bk communicate, and black ink is supplied from the container 7Bk to the printhead 10Bk via the tube 11 and the relay passage 94Bk.

The pair of claw portions 92 are plate-shaped members and project from the main body 90 in the left-and-right direction (the direction of the rotation axial line 5*a*) in a plan view of the connecting member 9Bk. Each holding portion 81 includes an opening portion OP (FIG. 2). The area of the opening portion OP is larger than the sectional area of the claw portion 92. When the claw portions 92 are inserted into the opening portions OP, the connecting member 9Bk is held by the head set cover 8 such that its posture can be changed. The engaging portions 96 and 97 correspond to the posture control portions 104 and 105 of the printhead 10Bk, respectively. The engaging portion 96 is arranged to engage with the posture control portion 104, and the engaging portion 97 is arranged to engage with the posture control portion 105. The engaging portions 96 and 97 are tubular members with holes 96*a* and 97*a*. The engaging portion 96 has a cylindrical shape in correspondence with the shape of the posture control portion 104, and the engaging portion 97 has an elliptic cylindrical shape in correspondence with the shape of the posture control portion 105.

As shown in FIG. 6, a distance R1 from the rotation center line 5*a* to the connecting portion 95Bk and a distance R2 from the rotation center line 5*a* to the engaging portions 96 and 97 hold a relationship given by R1<R2, and the distances R1 and R2 are different distances. The distance R1 and the distance R2 are the distances from the rotation center line 5*a* to the connecting portion 95Bk and the engaging portions 96 and 97 in a direction orthogonal to the rotation center line 5*a*, and are substantially the rotation radii at the time of rotation of the head set cover 8. The rotation radius of the engaging portions 96 and 97 is longer than that of the connecting portion 95Bk.

The connecting member 9Cr will be described. The basic structure of the connecting member 9Cr is the same as the connecting member 9Bk. The connecting member 9Cr includes the main body 90 and the sealing member 91. The main body 90 of the connecting member 9Cr integrally includes flow-in portions 93C, 93M, and 93Y provided at the front end portion, the pair of claw portions 92 provided on the left and right side portions, and connecting portions 95C, 95M, and 95Y and the engaging portions 96 and 97 which are provided on the bottom surface. The tube 11 that forms the ink supply passage for cyan ink, the tube 11 that forms the ink supply passage for magenta ink, and the tube 11 that forms the ink supply passage for yellow ink are connected to the flow-in portions 93C, 93M, and 93Y, respectively.

The connecting portions 95C, 95M, and 95Y are members connected to the ink introduction portions 103C, 103M, and 103Y of the printhead 10Cr, respectively. The connecting portions 95C, 95M, and 95Y according to this embodiment are tubular members, and the connecting ports 95*a* to/from which the ink introduction portions 103C, 103M, and 103Y are inserted/removed are formed in these. The elastic member 95*b* is provided on the inner circumferential surface of each of the connecting portions 95C, 95M, and 95Y. The elastic members 95*b* are sealing elastomers that seal the connecting ports 95*a* and the ink introduction portions 103C, 103M, and 103Y and are, for example, molded integrally with the connecting portions 95C, 95M, and 95Y.

Groove-shaped relay passages 94C, 94M, and 94Y through which the flow-in portions 93C, 93M, and 93Y and the connecting portions 95C, 95M, and 95Y communicate are formed on the upper surface of the main body 90 of the connecting member 9Cr. The sealing member 91 is, for example, a sheet-shaped film welded to the upper surface of the main body 90, and the relay passages 94C, 94M, and 94Y are sealed by the sealing member 91. When the connecting portion 95C and the ink introduction portion 103C are connected, the ink supply passage of the tube 11 and the ink introduction portion 103C communicate, and cyan ink is supplied from the container 7C to the printhead 10Cr via the tube 11 and the relay passage 94C. When the connecting portion 95M and the ink introduction portion 103M are connected, the ink supply passage of the tube 11 and the ink introduction portion 103M communicate, and magenta ink is supplied from the container 7M to the printhead 10Cr via the tube 11 and the relay passage 94M. When the connecting portion 95Y and the ink introduction portion 103Y are connected, the ink supply passage of the tube 11 and the ink introduction portion 103Y communicate, and yellow ink is supplied from the container 7Y to the printhead 10Cr via the tube 11 and the relay passage 94Y.

The pair of claw portions 92 of the connecting member 9Cr are plate-shaped members and project from the main body 90 in the left-and-right direction (the direction of the axis 5*a* of rotation) in a plan view of the connecting member 9Cr. Like the connecting member 9Bk, when the claw portions 92 are inserted into the opening portions OP, the connecting member 9Cr is held by the head set cover 8 such that its posture can be changed. The engaging portions 96 and 97 correspond to the posture control portions 104 and 105 of the printhead 10Cr, respectively. The engaging portion 96 is arranged to engage with the posture control portion 104, and the engaging portion 97 is arranged to engage with the posture control portion 105. The engaging portions 96 and 97 are tubular members. The engaging portion 96 has a cylindrical shape in correspondence with the shape of the posture control portion 104, and the engaging portion 97 has an elliptic cylindrical shape in correspondence with the shape of the posture control portion 105.

As shown in FIG. 6, distances R3 and R5 from the rotation center line 5*a* to the connecting portion 95M and the connecting portions 95C and 95Y and a distance R4 from the rotation center line 5*a* to the engaging portions 96 and 97 hold a relationship given by R3<R4<R5, and the distances R3 to R5 are different distances. The distances R3 to R5 are the distances from the rotation center line 5*a* to the connecting portion 95M and the connecting portions 95C and 95Y and the engaging portions 96 and 97 in a direction orthogonal to the rotation center line 5*a*, and are substantially the rotation radii at the time of rotation of the head set cover 8. The rotation radius of the engaging portions 96 and 97 is longer than that of the connecting portion 95M. The rotation radius of the engaging portions 96 and 97 is shorter than that of the connecting portions 95C and 95Y.

Referring to FIG. 5, broken lines D3 indicate the extending directions (axial directions) of the connecting portions 95Bk, 95Y, 95M, and 95C (to be referred to as connecting portions 95 hereinafter generically or without distinction). The broken lines D3 also indicate the connecting directions between the connecting portions 95Bk, 95Y, 95M, and 95C and the ink introduction portions 103Bk, 103Y, 103M, and 103C. Broken lines D4 indicate the extending directions (axial directions) of the engaging portions 96 and 97, and also indicate the connecting directions between the engaging portions 96 and 97 and the posture control portions 104 and 105. In this embodiment, the directions D3 and the directions D4 are parallel.

<Positioning Portion>

FIGS. 7 and 8 will mainly be referred to. A positioning portion 14 is provided on the head set cover 8. The positioning portion 14 is an engaging member biased by an elastic member 15 in a direction to press the printhead 10. In this embodiment, the elastic member 15 is a coil spring. Two sets of positioning portions 14 and elastic members 15 are provided, and the sets correspond to the printheads 10Bk and 10Cr, respectively. When the head set cover 8 rotates from the open position to the closed position, the positioning portion 14 engages with the engaging portion 106 of the printhead 10, and the printhead 10 is positioned at a predetermined position of the carriage 5.

<Biasing Portion>

The printing apparatus 1 includes a biasing portion 13 that biases the connecting member 9 to a predetermined posture. In this embodiment, the biasing portion 13 is an elastic member provided for each of the connecting members 9Bk and 9Cr and is particularly a coil spring. The biasing portion 13 is arranged between the upper wall portion 8*a* of the head set cover 8 and the connecting member 9. The head set cover 8 is provided with a shaft-shaped guide portion 83 that supports the biasing portion 13 (FIGS. 7 and 8). The biasing portion 13 contacts the sealing member 91 of the connecting member 9. FIG. 9A is a perspective view of the biasing portion 13, FIG. 9B is a plan view of the biasing portion 13, and FIG. 9C is a sectional view taken along a line B-B in FIG. 9B.

In this embodiment, the biasing portion 13 is configured to come into direct contact with the sealing member 91. Wire end portions 13*a* and 13*b* of the biasing portion 13 are bent inward in the axial direction. The wire end portions 13*a* and 13*b* are processed so as not to damage the sealing member 91 regardless of which end of the biasing portion 13 contacts the sealing member 91.

The biasing point of the biasing portion 13 to the connecting member 9 is set to a point apart from the claw portions 92 in the direction orthogonal to the rotation center line 5*a*, and in this embodiment, set to a point farther from the rotation center line 5*a* than the claw portions 92 (a point on the side of the flow-in portion 93).

FIG. 7 shows the initial posture of the connecting member 9Bk, and FIG. 8 shows the connecting posture of the connecting member 9Bk. The biasing portion 13 biases the connecting member 9Bk to the initial posture. The initial posture is the posture of the connecting member 9Bk in a state in which the connecting portion 95Bk is not connected to the ink introduction portion 103Bk, and the posture control portions 104 and 105 are apart from the engaging portions 96 and 97. The connecting posture is the posture in a state in which the connecting portion 95Bk is connected to the ink introduction portion 103Bk. In the connecting posture, the direction D1 and the direction D3 match, and the direction D2 and the direction D4 match. It can be said that the connecting posture is a posture in which the connecting portion 95Bk is directed to the connecting direction to the ink introduction portion 103Bk more than in the initial posture.

Aline L1 indicates a direction orthogonal to the direction D3 (and the direction D4) in the initial posture, and a line L2 indicates a direction orthogonal to the direction D3 (and the direction D4) in the connecting posture. It can be said that the line L1 and the line L2 are the reference lines of the posture of the connecting member 9Bk and correspond to the front-and-rear direction of the main body 90. As for the posture of the connecting member 9Bk with respect to the head set cover 8, when the line L2 is aligned in the front-and-rear direction of the head set cover 8, the posture changes by an angle θ between the initial posture and the connecting posture. The biasing portion 13 need only bias the connecting member 9Bk such that it tilts by the angle θ with respect to the head set cover 8, and its elastic force can be relatively small. The connecting member 9Bk has been described above, but the same can apply to the connecting member 9Cr.

"3. Operation"

Figure 10:
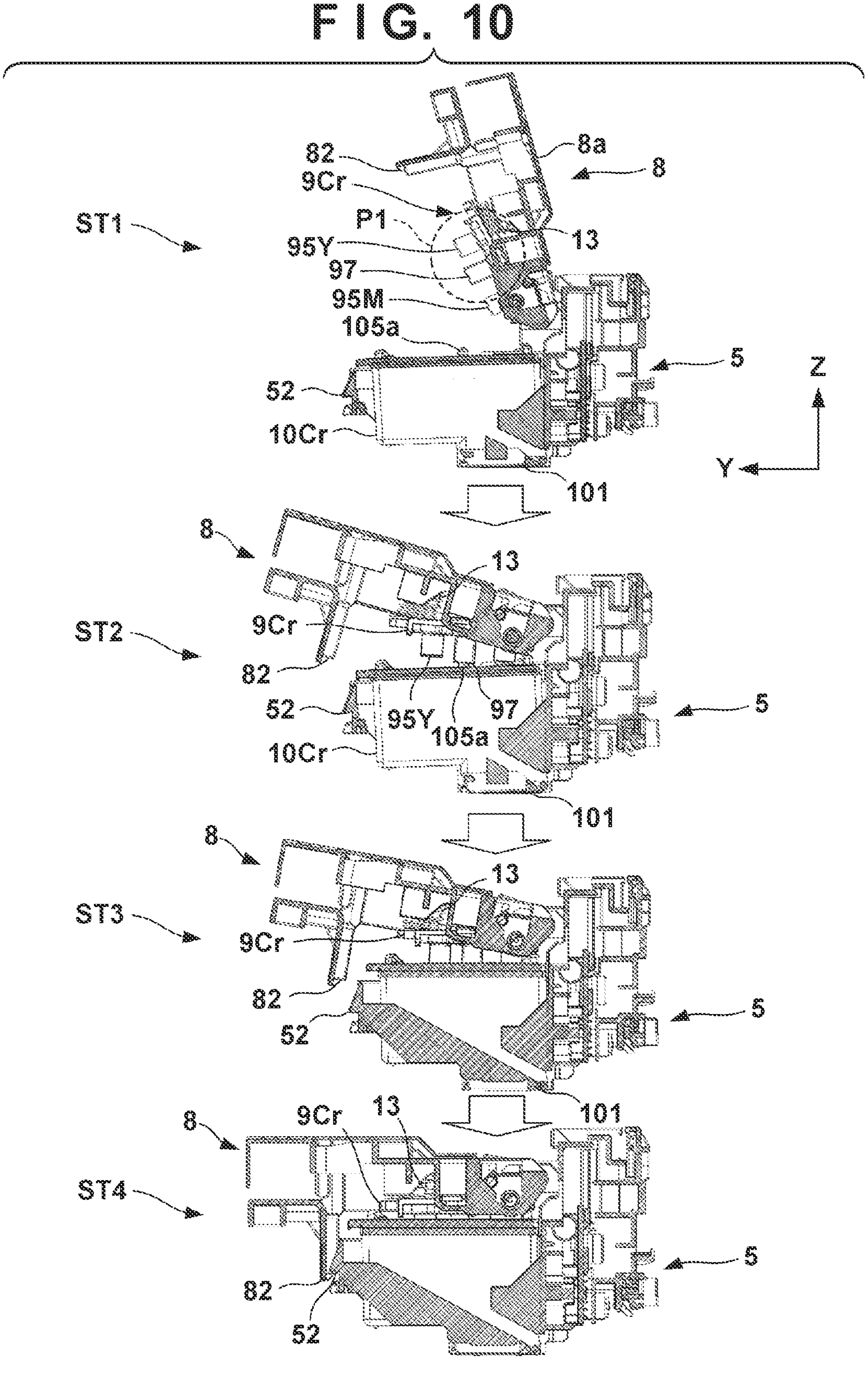
FIG. 10 is a view for explaining the operations of the head set cover and the connecting member.
Figure 11:
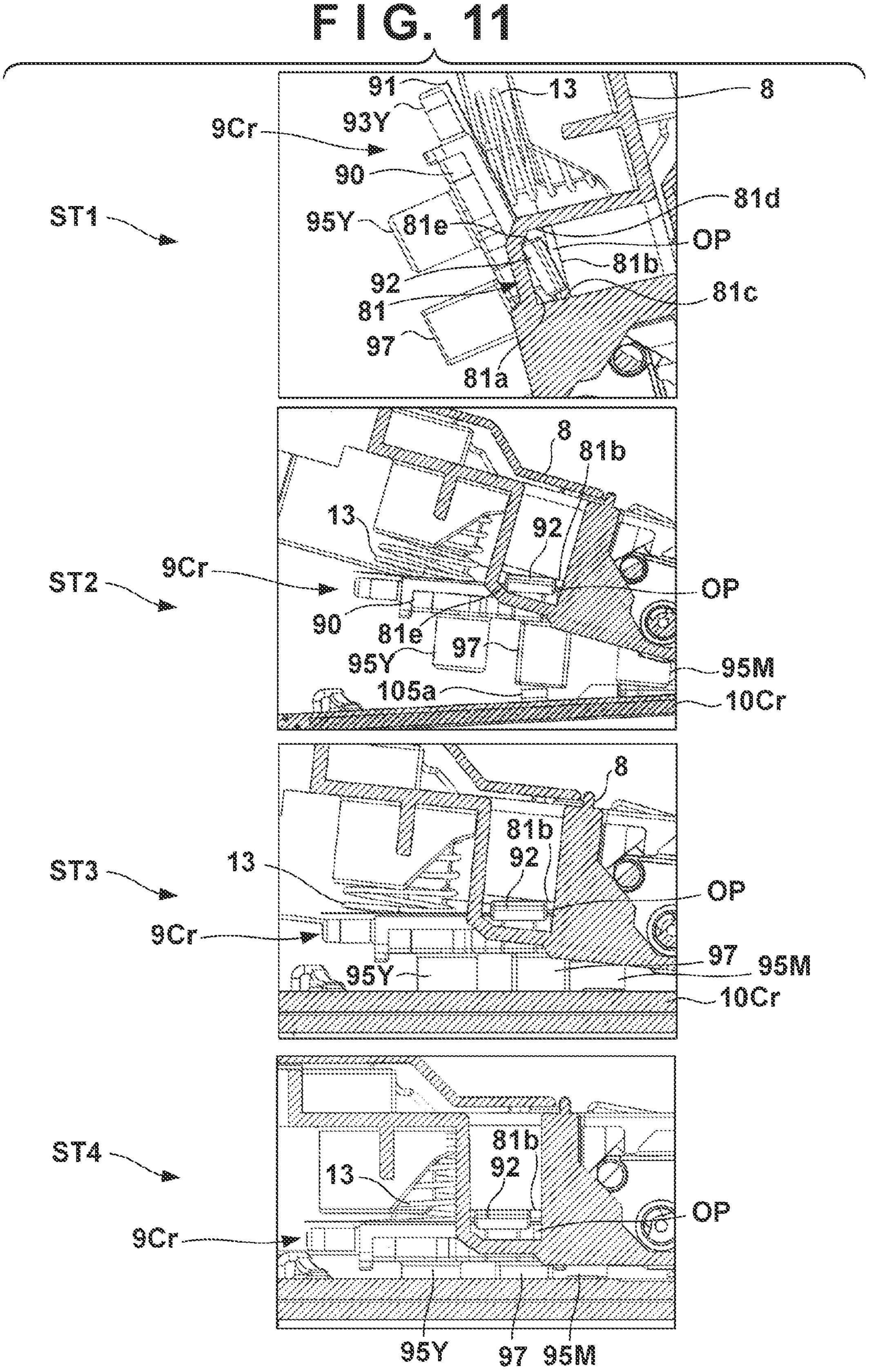
FIG. 11 is a view for explaining the operations of the head set cover and the connecting member.
Figure 12:
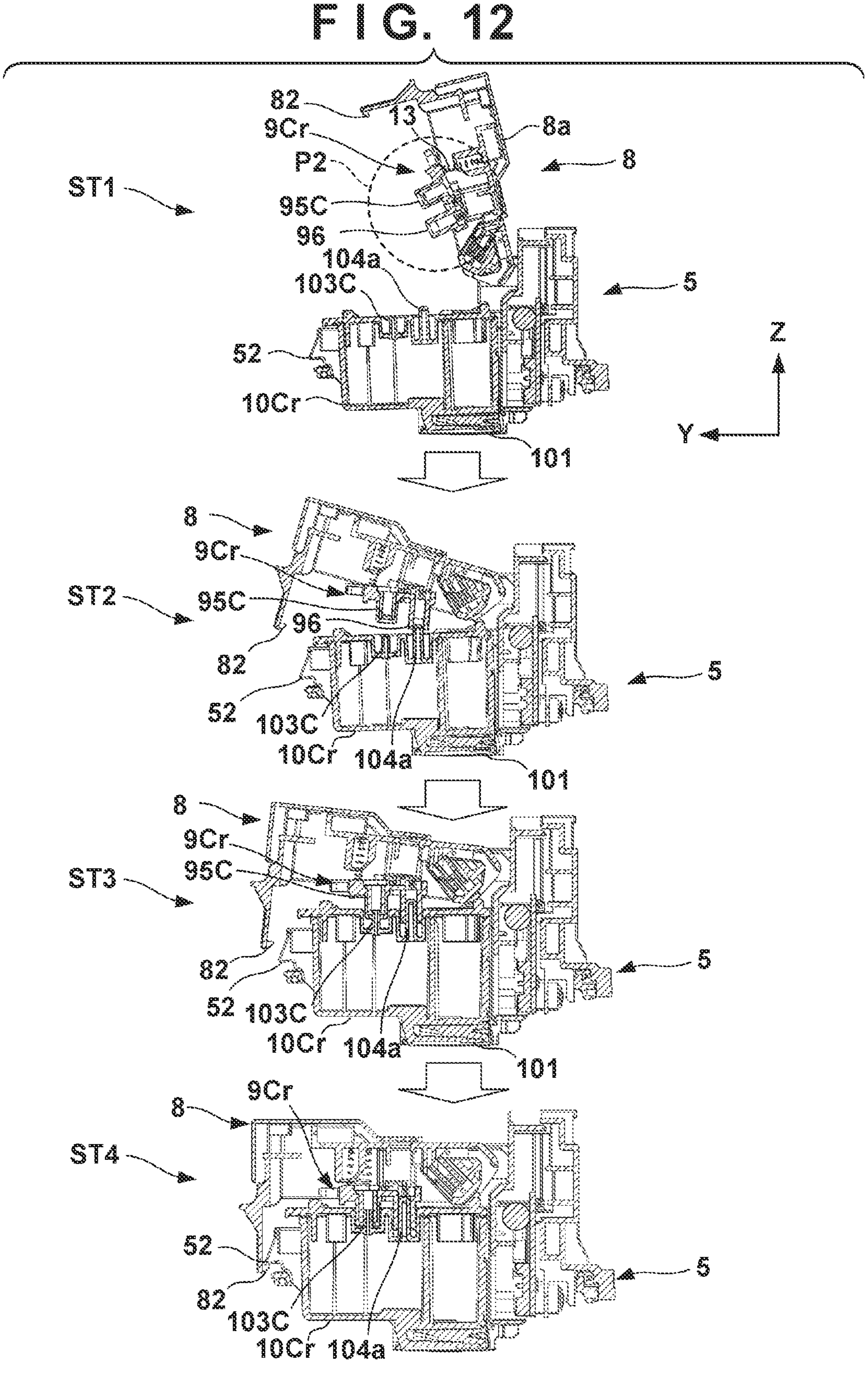
FIG. 12 is a view for explaining the operations of the head set cover and the connecting member.
Figure 13:
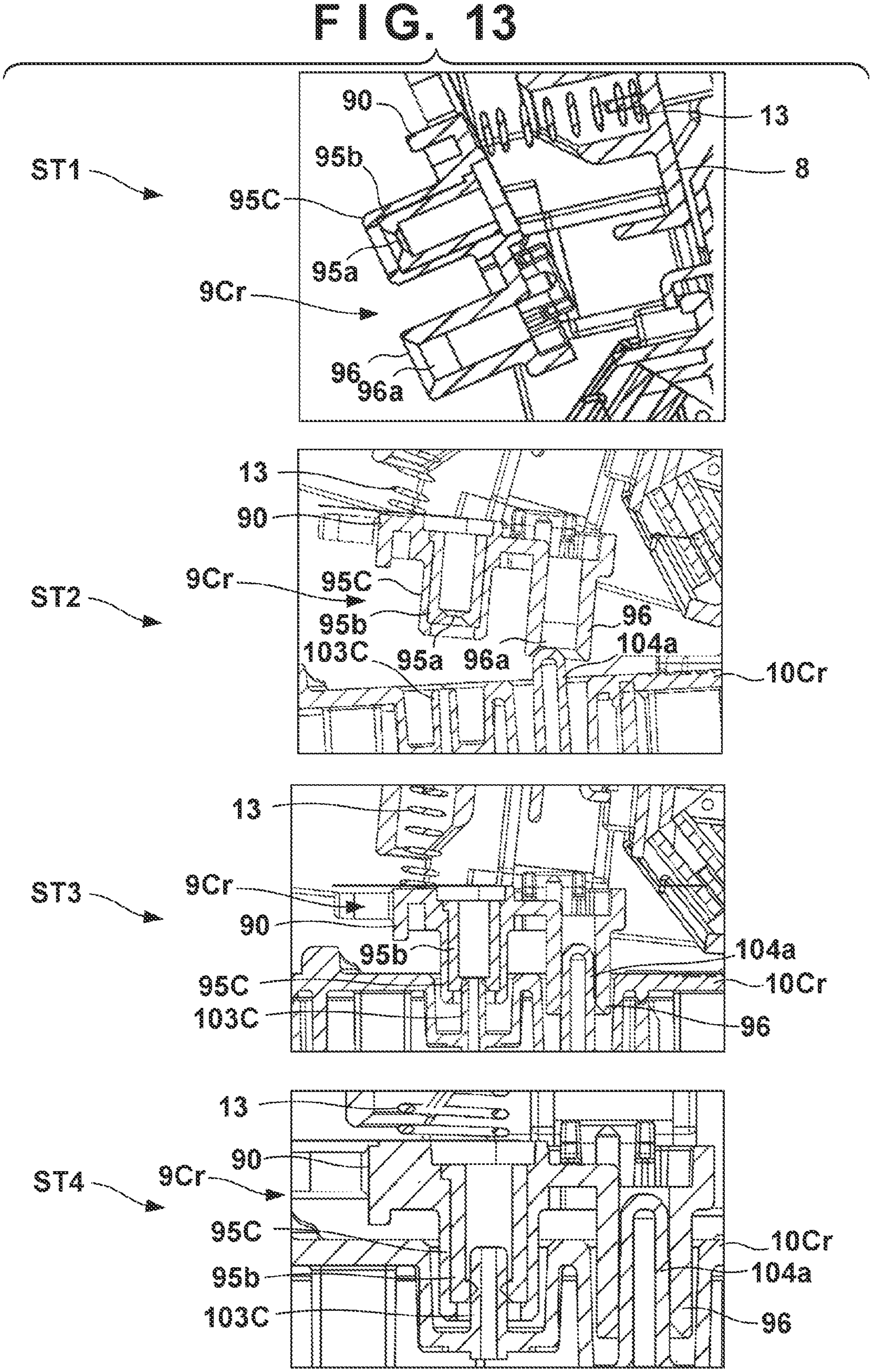
FIG. 13 is a view for explaining the operations of the head set cover and the connecting member.

The behavior and the like of the connecting member 9 when the head set cover 8 is rotated from the open position to the closed position will be described with reference to FIGS. 10 to 13. FIG. 10 is a sectional view taken along a lineC-C in FIG. 3, and is a view for explaining the operation, showing the rotation mode of the head set cover 8. FIG. 11 is an enlarged view of a portion P1 in FIG. 10. FIG. 12 is a sectional view taken along a line D-D in FIG. 3, and is a view for explaining the operation, showing the rotation mode of the head set cover 8. FIG. 13 is an enlarged view of a portion P2 in FIG. 12. States ST1 to ST4 in FIGS. 10 to 13 represent the same operation timings.

The state ST1 shows a state in which the head set cover 8 is at the open position, and the state ST4 shows a state in which the head set cover 8 is at the closed position. At the open position, the connecting member 9 is in the initial posture. At the closed position, the connecting member 9 is in the connecting posture. As for the relationship between the ink introduction portion 103 and the connecting portion 95, the closed position can be called a connecting position, and the open position can be called a connection releasing position. The states ST2 and ST3 are states halfway through rotation between the state ST1 and the state ST4.

FIGS. 10 to 13 show a transition such as a posture change of the connecting member 9Cr. Note that this also applies to a transition such as a posture change of the connecting member 9Bk.

In the state ST1, the connecting member 9Cr is in the initial posture. As indicated by the state ST1 in FIG. 11, the opening portion OP of the holding portion 81 is a pentagonal opening portion with linear edges 81*a* to 81*e*. The edge 81*a* and the edge 81*b* are parallel, and the edge 81*c* and the edge 81*d* are parallel. The edge 81*e* is a tilted edge between the edge 81*a* and the edge 81*d*.

In the initial posture, the claw portion 92 of the connecting member 9Cr is in contact with the edges 81*a* to 81*e* of the opening portion OP at a plurality of points. More specifically, the claw portion 92 is in contact with the edges of the opening portion OP at three points of the edges 81*a*, 81*b*, and 81*e*. Since the opening portion OP is formed into not a rectangular shape but a pentagonal shape, the positioning accuracy of the connecting member 9Cr can be improved while smoothly performing the posture change of the connecting member 9Cr.

The operation of rotating the head set cover 8 from the open position to the closed position is performed by, for example, the user. When the head set cover 8 starts rotating counterclockwise in FIGS. 10 to 13, the state ST2 is obtained. At this stage, as indicted by the state ST2 in FIGS. 11 and 13, the posture control portion 105 and the corresponding engaging portion 97 start engaging. More specifically, the shaft portion 105*a* starts entering the hole 97*a*. This also applies to the shaft portion 104*a* of the posture control portion 104 and the corresponding engaging portion 96. On the other hand, at this stage, the ink introduction portion 103 and the connecting portion 95 are apart. That is, in the process of rotation of the head set cover 8 from the open position to the closed position, the posture control portions 104 and 105 and the engaging portions 96 and 97 start contacting (or engaging) before the ink introduction portion 103 and the connecting portion 95. Also, although not illustrated, at the stage of the state ST2, the positioning portion 14 engages with the engaging portion 106 of the printhead 10, and the printhead 10 starts to be positioned at a predetermined position of the carriage 5.

When the rotation of the head set cover 8 progresses, the state ST3 is obtained. At this stage, as indicted by the state ST3 in FIGS. 11 and 13, the engagement between the posture control portion 105 and the corresponding engaging portion 97 progresses. This also applies to the posture control portion 104 and the corresponding engaging portion 96. When the shaft portion 105*a* enters the hole 97*a*, axis adjustment for positioning both on the same axis acts. That is, axis adjustment for aligning the direction D2 and the direction D4 acts. Accordingly, the connecting member 9Cr changes its posture against the biasing of the biasing portion 13, and the claw portion 92 starts separating from the edges 81*a* and 81*e*. The posture of the connecting member 9Cr becomes close to the connecting posture, the direction D1 and the direction D3 start to be aligned, and in this state, the ink introduction portion 103 and the connecting portion 95 start to be connected. Also, by the engagement between the positioning portion 14 and the engaging portion 106 of the printhead 10, the printhead 10 starts to be positioned at a predetermined position of the carriage 5.

When the rotation of the head set cover 8 progresses, the state ST4 is obtained. At this stage, the posture of the connecting member 9Cr reaches the connecting posture. Thus, in the rotation process of the head set cover 8, the posture of the connecting member 9Cr can automatically be changed. As indicated by the state ST4 in FIGS. 11 and 13, the engagement between the posture control portion 105 and the corresponding engaging portion 97 is completed, and the connection between the ink introduction portion 103 and the connecting portion 95 is completed. The claw portion 92 is in contact with the edge 81*b* with a surface. The lock portion 82 is locked with the lock portion 52, and the head set cover 8 is maintained at the closed position. The printhead 10 is fixed to the carriage 5.

As described above, in this embodiment, by the rotation of the head set cover 8 from the open position to the closed position, fixing of the printhead 10 and connection between the ink introduction portion 103 and the connecting portion 95 can simultaneously be performed, and ink can be supplied from the container 7 to the printhead 10 immediately. When the lock between the lock portion 82 and the lock portion 52 is released, the head set cover 8 automatically rotates to the open position by the biasing of the elastic member 12. At this time, the connecting member 9 returns to the initial posture by an operation reverse to the states ST1 to ST4, and the connection between the ink introduction portion 103 and the connecting portion 95 is released. By only releasing the lock between the lock portion 82 and the lock portion 52, the user can detach the printhead 10 from the carriage 5 and exchange it.

In this embodiment, the following advantage can be obtained by providing the biasing portion 13 and the holding portions 81 as a mechanism for changing the posture of the connecting member 9. That is, immediately before the ink introduction portion 103 and the connecting portion 95 are connected, the connecting member 9 can be changed to a posture suitable for the connection between these along with the rotation of the head set cover 8, and the connection accuracy can be improved. In particular, it is possible to reduce the possibility that the ink introduction portion 103 and the connecting portion 95 start to be obliquely connected to each other, and a connection failure occurs.

Since the connecting member 9 is always biased by the biasing portion 13 and pressed against the edges of the opening portion OP, the posture of the connecting member 9 is stable. During the rotation of the head set cover 8, the posture of the connecting member 9 can be prevented from changing to an unintended posture. From this viewpoint as well, it is possible to reduce the possibility of a connection failure between the ink introduction portion 103 and the connecting portion 95 and improve the connection accuracy.

The posture change of the connecting member 9 does not restrict the rotation of the head set cover 8, and the head set cover 8 and the connecting member 9 can smoothly be displaced toward each other.

Also, by the configuration according to this embodiment, the connection accuracy between the ink introduction portion 103 and the connecting portion 95 can be improved while reducing the size of the head set cover 8. This point will be described with reference to FIGS. 14A and 14B. FIG. 14A shows, as a comparative example, an example of a configuration without the mechanism for changing the posture of the connecting member 9. Along with the rotation of the head set cover 8, the connecting portion 95 moves on an arc with a rotation radius R from the rotation center line 5*a*.

If a connecting direction DO between the ink introduction portion 103 and the connecting portion 95 is substantially orthogonal to a line Dr that is orthogonal to the rotation center line 5*a*, connection between the ink introduction portion 103 and the connecting portion 95 is smoothly done if the rotation radius R is long. This is because the moving direction of the connecting portion 95 is close to the connecting direction DO near the ink introduction portion 103. However, if the rotation radius R is short, the angle of the moving direction of the connecting portion 95 crossing the connecting direction DO near the ink introduction portion 103 becomes large. Hence, a connection failure readily occurs. To improve the connection accuracy, the rotation radius R needs to be long, and this makes the apparatus bulky.

Figure 14B:
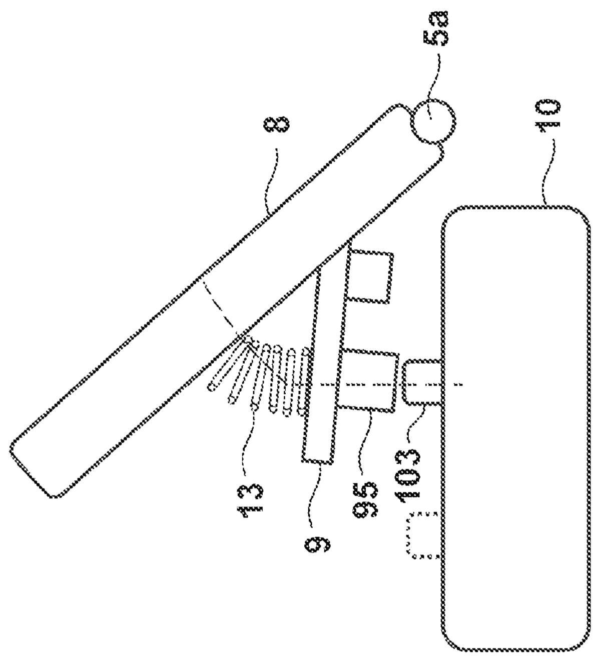
FIGS. 14A and 14B are explanatory views of a principle.
Figure 14A:
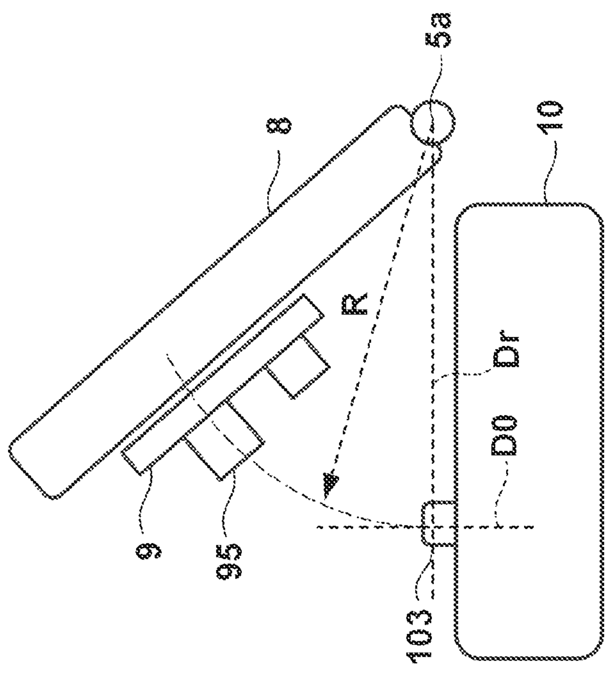

On the other hand, in this embodiment, as shown in FIG. 14B, the posture of the connecting member 9 changes during the process of the rotation of the head set cover 8, and the connecting portion 95 can be connected to the ink introduction portion 103 not by a circular motion but in a state close to a linear motion. Hence, even if the rotation radius R of the connecting portion 95 is short, the connection accuracy can be improved, and the size of the apparatus can be reduced.

Second Embodiment

In the first embodiment, the biasing portion 13 is arranged between the head set cover 8 and the connecting member 9. However, the disposition point of a biasing portion 13 is not limited to this. For example, the biasing portion 13 may be arranged between a connecting member 9 and a printhead 10.

Also, in the first embodiment, a coil spring is used as the biasing portion 13. However, another component can be employed as the biasing portion 13. For example, rubber or a resin may be used.

Figure 15:
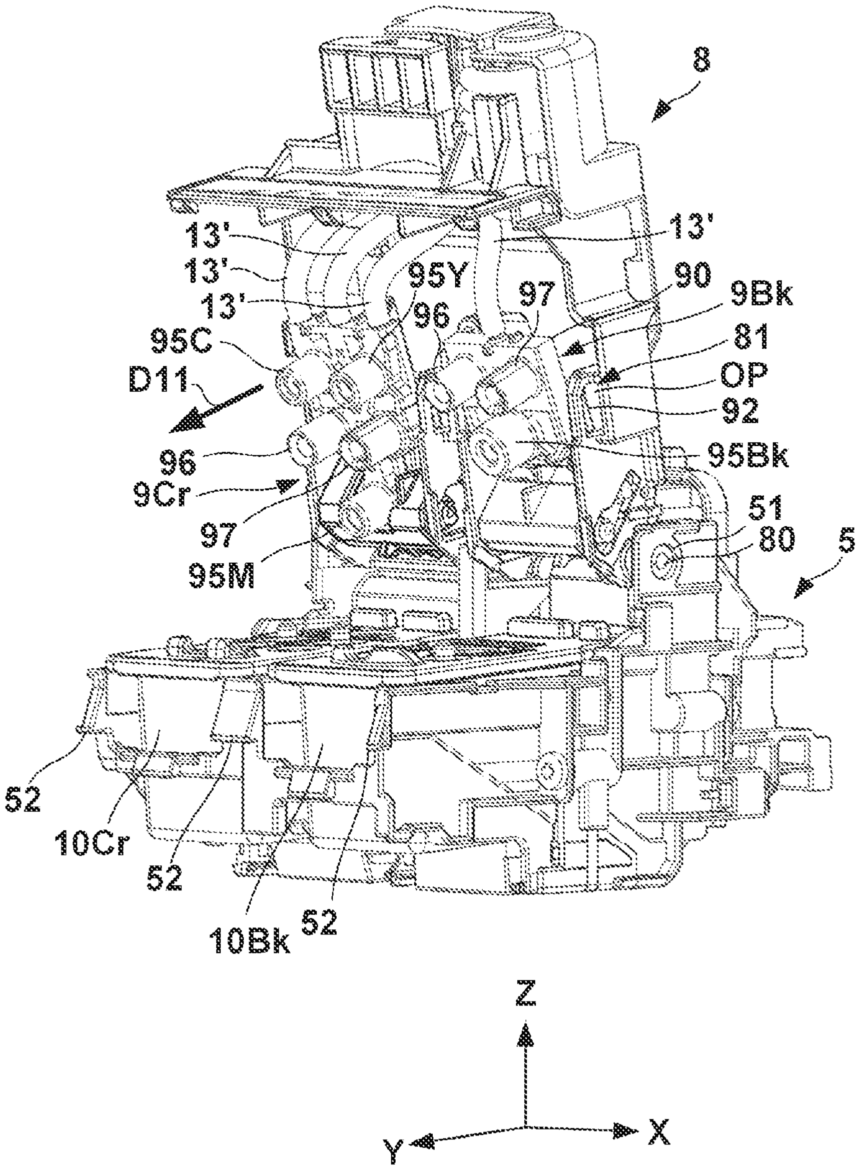
FIG. 15 is a view showing a mode in which a tube is used as a biasing portion.

Also, as the biasing portion 13, a tube 11 with flexibility may be used. FIG. 15 shows an example. In the example shown in FIG. 15, the tube 11 that forms an ink supply passage is used as a biasing portion 13', and the biasing portion 13 formed by a coil spring in the first embodiment is not provided. In a holding portion 84, the tube 11 is fixed to a head set cover 8 at its middle portion. Using the flexibility of the tube 11, the connecting member 9 can be biased to the initial posture, as indicated by an arrow D11. Note that three tubes 11 are used as the biasing portions 13' for a connecting member 9Cr, and one tube 11 is used as the biasing portion 13' for a connecting member 9Bk. The material, diameter, thickness, hardness, and length (extra length) from the holding portion 84 may be changed between the three tubes 11 connected to the connecting member 9Cr and the one tube 11 connected to the connecting member 9Bk. For example, if the biasing force is insufficient for the connecting member 9Bk, as the tube 11 for black ink, a tube having a larger thickness (stronger elastic force) or diameter than the tubes 11 for the remaining inks may be used. According to this embodiment, the number of parts can be decreased.

Also, the biasing portion 13 may use not the elastic force but gravity. For example, a sinker fixed to the connecting member 9 may be used. The sinker may be a member different from the connecting member 9, or may be a portion which is integrated with the connecting member 9 and whose weight is increased by making the portion thicker than the remaining portions.

Third Embodiment

A claw portion 92 and an opening portion OP can employ vanous structures.

Figure 16A:
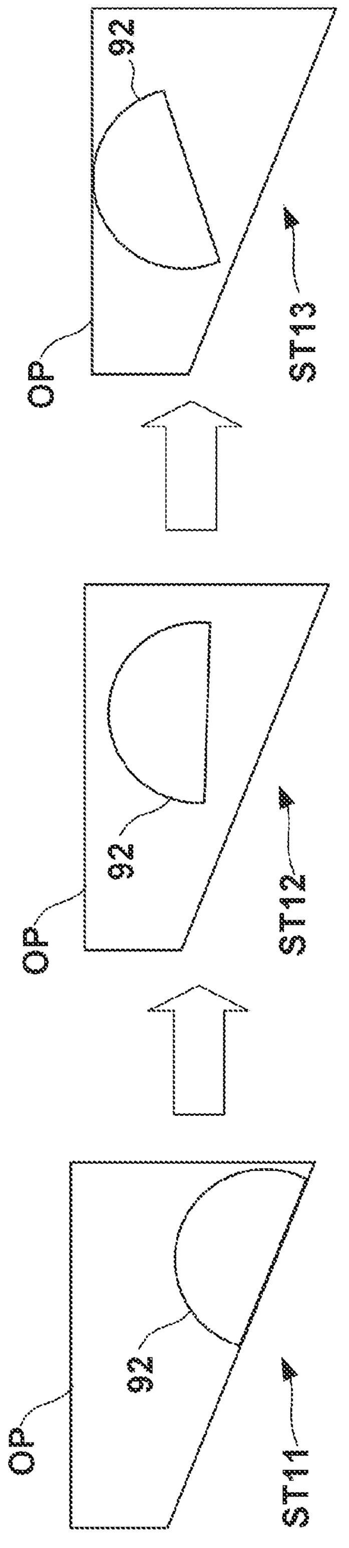
FIGS. 16A and 16B are views showing another example of an opening portion and a claw portion.

FIG. 16A shows an example. In the example shown in FIG. 16A, the claw portion 92 is a member having a semicircular section. The opening portion OP has a rectangular shape. In FIG. 16A, a state ST11 indicates a state in which a connecting member 9 is in an initial posture, a state ST13 indicates a state in which the connecting member 9 is in a connecting posture, and a state ST12 indicates a state in which the connecting member 9 is in a posture between the initial posture and the connecting posture. In the initial posture indicated by the state ST11, the plane portion of the claw portion 92 is in contact with an edge of the opening portion OP with a surface. Since the claw portion 92 and the edge of the opening portion OP are in surface contact, the posture of the connecting member 9 is stable. In the state ST12, the claw portion 92 does not contact the edge of the opening portion OP. In the state ST13, the arc circumferential surface portion of the claw portion 92 is in contact with an edge of the opening portion OP at one point.

Figure 16B:
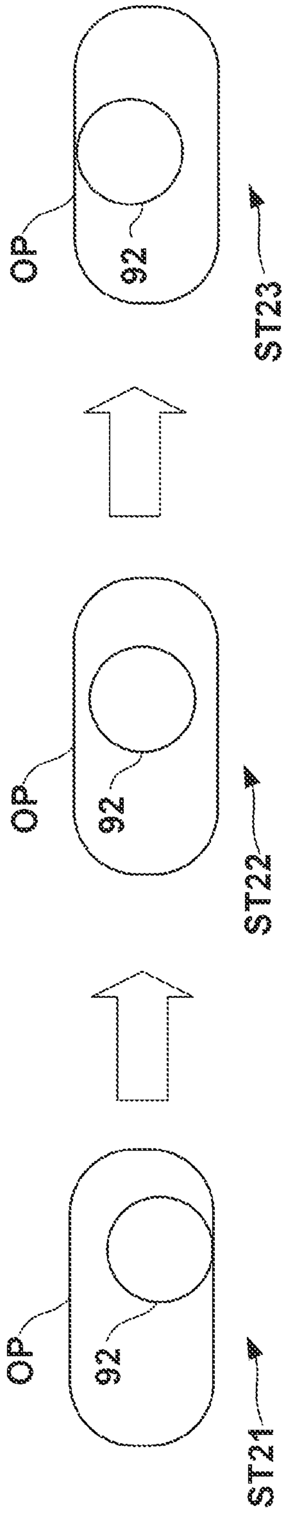

FIG. 16B shows another example. In the example shown in FIG. 16B, the claw portion 92 is a member having a circular section. The opening portion OP has an elliptic shape. In FIG. 16B, a state ST21 indicates a state in which the connecting member 9 is in the initial posture, a state ST23 indicates a state in which the connecting member 9 is in a connecting posture, and a state ST22 indicates a state in which the connecting member 9 is in a posture between the initial posture and the connecting posture. In the initial posture indicated by the state ST21, the circumferential surface portion of the claw portion 92 is in contact with an edge of the opening portion OP at one point. In the state ST22, the claw portion 92 does not contact the edge of the opening portion OP. In the state ST23, the circumferential surface portion of the claw portion 92 is in contact with an edge of the opening portion OP at one point.

In the configuration shown in FIG. 16B, regulation to the posture of the connecting member 9 may be weak. Hence, an example of a configuration shown in FIG. 17 can be used together. In the example of the configuration shown in FIG. 17, a head set cover 8 is provided with a contact portion 85, and a connecting member 9Bk is provided with a contact portion 98 that comes into contact with the contact portion 85. The contact surface of the contact portion 85 is formed as a tilting surface, and the contact portion 98 contacts the tilting surface. Note that the head set cover 8 is provided with the contact portion 85 for a connecting member 9Cr, and the connecting member 9Cr is provided with the corresponding contact portion 98.

Figure 17:
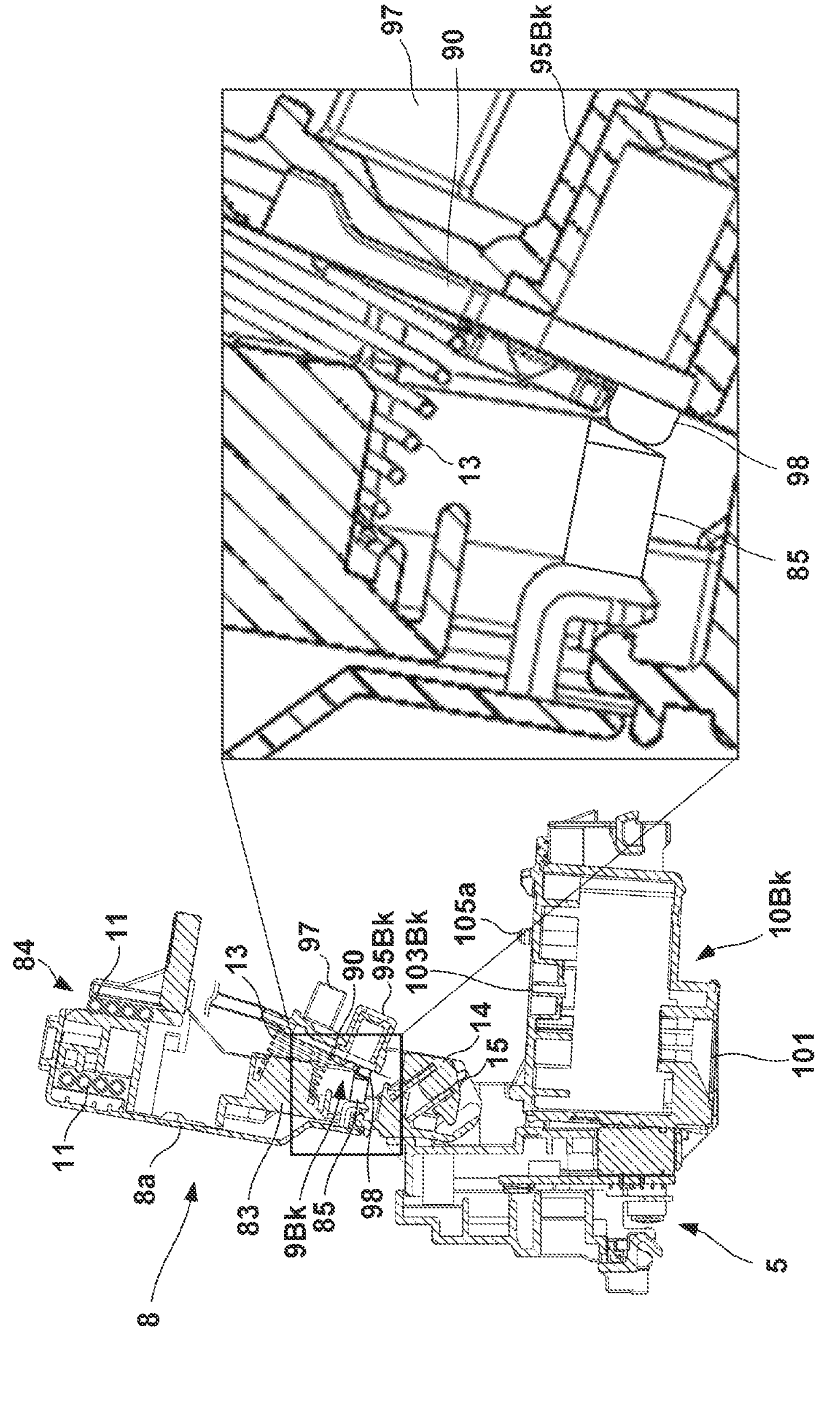
FIG. 17 is a view showing another example of a configuration for regulating the posture of the connecting member.

FIG. 17 shows a state in which the head set cover 8 is located at the open position, and the connecting member 9Bk is in an initial posture. The posture of the connecting member 9Bk can be regulated by the angle of the tilting surface of the contact portion 85 and the shape of the contact portion 98.

Fourth Embodiment

In the above-described embodiments, an example of a configuration in which a plurality of types of posture control portions 104 and 105 with different sectional shapes and corresponding engaging portions 96 and 97 are provided has been described. However, there may be only one type of posture control portions and corresponding engaging portions. Also, in the above-described embodiments, for one set of a printhead 10 and a connecting member 9, a plurality of sets of posture control portions and corresponding engaging portions are provided. However, only one set may be provided.

In the above-described embodiments, the posture control portions 104 and 105 are provided on the printhead 10. However, these may be provided on another point. For example, the posture control portions may be provided on a carriage 5, and the positions of the engaging portions 96 and 97 are designed in accordance with the disposition points of the posture control portions.

In the above-described embodiments, as the posture control portions 104 and 105, structures including a shaft portion 104*a* having a columnar shape (circular section) and a shaft portion 105*a* having an elliptic columnar shape (elliptic section) have been described. However, the structures of the posture control portions are not limited to these, and various shapes can be employed.

The number of ink introduction portions 103, the distance between each ink introduction portion 103 and the rotation center line 5*a*, the types and the number of posture control portions 104 and 105, and the distance between each of the posture control portions 104 and 105 and the rotation center line 5*a* can appropriately be designed. The initial posture and the connecting posture of the connecting member 9 are also appropriately designed in accordance with the configuration of the apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-073671, filed Apr. 27, 2022, which is hereby incorporated by reference herein in its entirety.

What is claimed is:

1. A printing apparatus comprising:

a support member configured to support a printhead that performs printing by discharging ink to a print medium;

a connecting member including a connecting portion connected to an ink introduction portion of the printhead and through which the ink introduction portion communicates with an ink supply passage via the connecting portion;

a rotation member configured to hold the connecting member such that a posture of the connecting member is changeable, and configured to be supported by the support member to be rotatable between a connecting position at which the ink introduction portion and the connecting portion are connected and a connection releasing position at which the ink introduction portion and the connecting portion are not connected; and a biasing portion configured to bias the connecting member to a first posture with respect to the rotation member, wherein the connecting member includes an engaging portion configured to engage with a posture control portion provided at a predetermined point, and during a process of rotation of the rotation member from the connection releasing position to the connecting position, the engaging portion engages with the posture control portion, and the connecting member changes from the first posture to a second posture against the biasing of the biasing portion.

2. The apparatus according to claim 1, wherein the posture control portion is provided on the printhead.

3. The apparatus according to claim 1, wherein the second posture is a posture in which the connecting portion is directed in a connecting direction further toward the ink introduction portion than in the first posture.

4. The apparatus according to claim 1, wherein the rotation member includes at least one opening portion configured to hold the connecting member, the connecting member includes a claw portion configured to be inserted into the opening portion, and by the biasing of the biasing portion, the claw portion contacts an edge of the opening portion, and the connecting member is maintained in the first posture.

5. The apparatus according to claim 4, wherein in the first posture, the claw portion contacts the edge of the opening portion at a plurality of points.

6. The apparatus according to claim 4, wherein in the first posture, the claw portion contacts the edge of the opening portion with a surface.

7. The apparatus according to claim 4, wherein in the second posture, the claw portion contacts the edge of the opening portion.

8. The apparatus according to claim 4, wherein the at least one opening portion opens in a rotation axis direction of the rotation member, and includes two opening portions which are provided apart in the rotation axis direction, and the claw portion projects in the rotation axis direction, and one claw portion is provided in correspondence with each opening portion.

9. The apparatus according to claim 4, wherein one of the posture control portion and the engaging portion includes a shaft portion, and the other includes a tube portion to/from which the shaft portion is inserted/removed.

10. The apparatus according to claim 9, wherein an axial direction of the shaft portion and the tube portion is parallel to a connecting direction between the connecting portion and the ink introduction portion.

11. The apparatus according to claim 9, wherein a distance between the engaging portion and a rotation center of the rotation member and a distance between the connecting portion and the rotation center of the rotation member are different, and a distance between the posture control portion and the rotation center of the rotation member and a distance between the ink introduction portion and the rotation center of the rotation member are different.

12. The apparatus according to claim 1, wherein the rotation member includes:

an opening portion configured to hold the connecting member; and a contact portion that the connecting member contacts, the connecting member includes a claw portion to be inserted into the opening portion, and by the biasing of the biasing portion, the connecting member contacts the contact portion, and the connecting member is maintained in the first posture.

13. The apparatus according to claim 1, wherein the rotation member includes a cover portion configured to cover the printhead, and at the connecting position, the connecting member is located between the cover portion and the printhead.

14. The apparatus according to claim 13, wherein the biasing portion is an elastic member arranged between the cover portion and the connecting member.

15. The apparatus according to claim 13, wherein
the biasing portion is a flexible tube connected to the connecting member and forming the ink supply passage.

16. The apparatus according to claim 1, wherein
the support member is a carriage configured to move in a widthwise direction of the print medium.

17. The apparatus according to claim 1, wherein
the printhead is detachably supported by the support member, and
the rotation member includes a positioning portion configured to position the printhead with respect to the support member at the connecting position.

18. The apparatus according to claim 1, wherein
the support member includes a lock portion configured to maintain the rotation member at the connecting position.

19. A printing apparatus comprising:
a printhead configured to perform printing by discharging ink to a print medium;
a support member configured to support the printhead;
a connecting member including a connecting portion connected to an ink introduction portion of the printhead and through which the ink introduction portion communicates with an ink supply passage via the connecting portion;
a rotation member configured to hold the connecting member such that a posture of the connecting member is changeable, and configured to be supported by the support member to be rotatable between a connecting position at which the ink introduction portion and the connecting portion are connected and a connection releasing position at which the ink introduction portion and the connecting portion are not connected; and
a biasing portion configured to bias the connecting member to a first posture with respect to the rotation member,
wherein the connecting member includes an engaging portion configured to engage with a posture control portion provided at a predetermined point, and
during a process of rotation of the rotation member from the connection releasing position to the connecting position, the engaging portion engages with the posture control portion, and the connecting member changes from the first posture to a second posture against the biasing of the biasing portion.

20. A printhead exchangeably mounted in a printing apparatus, wherein
the printhead comprises an ink introduction portion, and
the printing apparatus includes:
a support member configured to support the printhead;
a connecting member including a connecting portion connected to an ink introduction portion of the printhead and through which the ink introduction portion communicates with an ink supply passage via the connecting portion;
a rotation member configured to hold the connecting member such that a posture of the connecting member is changeable, and configured to be supported by the support member to be rotatable between a connecting position at which the ink introduction portion and the connecting portion are connected and a connection releasing position at which the ink introduction portion and the connecting portion are not connected; and
a biasing portion configured to bias the connecting member to a first posture with respect to the rotation member,
wherein the printhead includes a posture control portion,
the connecting member includes an engaging portion configure to engage with the posture control portion, and
during a process of rotation of the rotation member from the connection releasing position to the connecting position, the engaging portion engages with the posture control portion, and the connecting member changes from the first posture to a second posture against the biasing of the biasing portion.

* * * * *